(12) United States Patent
Sunata

(10) Patent No.: US 10,848,547 B2
(45) Date of Patent: Nov. 24, 2020

(54) MONITORING SYSTEM AND METHOD

(71) Applicant: CANON KABUSHIKI KAISHA, Tokyo (JP)

(72) Inventor: Jin Sunata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 15/405,051

(22) Filed: Jan. 12, 2017

(65) Prior Publication Data
US 2017/0214735 A1 Jul. 27, 2017

(30) Foreign Application Priority Data

Jan. 21, 2016 (JP) .................................. 2016-009608

(51) Int. Cl.
| | | |
|---|---|---|
| G06F 15/173 | (2006.01) | |
| H04L 29/08 | (2006.01) | |
| H04L 12/26 | (2006.01) | |

(52) U.S. Cl.
CPC .............. H04L 67/10 (2013.01); H04L 43/08 (2013.01); H04L 67/16 (2013.01)

(58) Field of Classification Search
CPC .... F24F 11/30; G06F 19/00; G02B 2027/014; G02B 2027/0138
See application file for complete search history.

(56) References Cited

U.S. PATENT DOCUMENTS

| | | | | |
|---|---|---|---|---|
| 9,354,999 B2* | 5/2016 | Takami | ............... | G06F 11/0733 |
| 2007/0026854 A1* | 2/2007 | Nath | ..................... | H04W 24/00 |
| | | | | 455/423 |
| 2009/0307763 A1* | 12/2009 | Rawlins | ............... | G06F 9/44505 |
| | | | | 726/5 |
| 2011/0007365 A1* | 1/2011 | Yukumoto | ......... | H04N 1/00204 |
| | | | | 358/442 |
| 2011/0010570 A1* | 1/2011 | Hikichi | ................. | G06F 3/1221 |
| | | | | 713/320 |
| 2011/0092198 A1* | 4/2011 | Miyata | .............. | H04W 36/0022 |
| | | | | 455/422.1 |
| 2013/0018979 A1* | 1/2013 | Cohen | ................... | H04L 67/125 |
| | | | | 709/217 |

(Continued)

FOREIGN PATENT DOCUMENTS

JP 2013-114654 A 6/2013

*Primary Examiner* — Umar Cheema
*Assistant Examiner* — Tesdu N Mekonen
(74) *Attorney, Agent, or Firm* — Canon U.S.A., Inc. IP Division

(57) ABSTRACT

A system includes a management apparatus including a registration unit configured to register information which includes identification information of a device to be targeted for monitoring and is used for managing the device, wherein the management apparatus manages a communication history of one or more communications that were performed from each device to the management apparatus, and, in a case where there are one or more devices information about which is not registered by the registration unit and the managed communication history about which indicates that one or more communications were performed, extracts a device which satisfies a predetermined condition from among the one or more devices and performs processing for inhibiting a communication that is performed from the extracted device.

14 Claims, 13 Drawing Sheets

(56) References Cited

U.S. PATENT DOCUMENTS

| | | | |
|---|---|---|---|
| 2013/0100490 A1* | 4/2013 | Imoto | G06F 3/1207 358/1.15 |
| 2013/0145221 A1* | 6/2013 | Kaneko | H04L 41/12 714/48 |
| 2013/0246599 A1* | 9/2013 | Yan | H04L 41/0206 709/223 |
| 2014/0112656 A1* | 4/2014 | Yamashita | H04L 12/44 398/16 |
| 2014/0156852 A1* | 6/2014 | Moon | G06F 11/3664 709/226 |
| 2014/0300916 A1* | 10/2014 | Boldt | G06F 3/1261 358/1.14 |
| 2015/0193181 A1* | 7/2015 | Katano | G06F 3/1238 358/1.15 |
| 2016/0065430 A1* | 3/2016 | Hirahara | H04L 43/065 709/224 |
| 2016/0224291 A1* | 8/2016 | Ishino | G06F 3/1238 |
| 2016/0242024 A1* | 8/2016 | Karren | H04W 4/50 |

\* cited by examiner

FIG.7

REGISTRATION > REGISTRATION OF DEVICE

[ SAVE ] [ COPY ] [ DELETE ]

BE SURE TO ENTER THE ITEMS MARKED WITH *.

* VALID/INVALID: [VALID ▼]

BASIC INFORMATION
* CLIENT NAME: [SAMPLE CLIENT ▼]
* CONTRACT NUMBER: [SAMPLE CONTRACT ▼]
* SERVICE TYPE: [TYPE A ▼]
* TIME ZONE: [JAPAN ▼]
CONNECTION FORM: ○ VIA RELAY DEVICE  ● DIRECT CONNECTION
* RELAY DEVICE ID: [– PLEASE SELECT – ▼]
* DEVICE ID: [deviceA001]  [ ACQUISITION OF PRODUCT NAME ]
* PRODUCT NAME: [DEVICE A ▼]
TONER MONITORING TARGET ALARM: [TONER REPLACEMENT ▼]
* DATE OF PLACEMENT (yyyy-mm-dd): [2014-01-03]
DATE OF REMOVAL (yyyy-mm-dd): [ ]
* CONTRACT START DATE: [2014-01-10]
CONTRACT END DATE: [ ]

PLACEMENT LOCATION INFORMATION
DEVICE PLACEMENT LOCATION: [ ]
BUILDING NAME: [ ]
POSTAL CODE: [ ]
ADDRESS: [ ]

PLACEMENT INFORMATION
+DEVICE ADMINISTRATOR: [DEVICE ADMINISTRATOR A ▼]  E-MAIL ADDRESS: xxx@xxxx.xxxx.xxx
TELEPHONE NUMBER: xx-xx-xxxxxx CONTACT INFORMATION ABOUT PERSON IN CHARGE OF SERVICE
E-MAIL ADDRESS OF PERSON IN CHARGE OF DISPATCH: [sample@hogehoge.com]
E-MAIL ADDRESS OF PERSON IN CHARGE OF CONSUMABLES: [sample@hogehoge.com]

CREATING PERSON: userA                CREATION DATE: 2014/1/1
LAST UPDATING PERSON: userB           DATA OF LAST UPDATE: 2014/2/1

FIG.8A REGISTERED DEVICE

| PK | DEVICE ID | UNREGISTERED |
|---|---|---|
| 100 | ABC00001 | 0 |
| 200 | BBB00001 | 1 |

FIG.8B DEVICE COMMUNICATION HISTORY

| PK | RECEPTION DATE AND TIME | DATA TYPE | DETERMINATION |
|---|---|---|---|
| 100 | 2015/05/01 09:10:24 | 1 | AUTHENTICATION ERROR |
| 200 | 2015/05/01 11:20:30 | 4 | SUCCESSFUL |
| : | : | : | |

FIG.8C DEVICE COMMUNICATION TYPE

| DATA TYPE | DATA TYPE DEFINITION |
|---|---|
| 1 | CONNECTIVITY TEST |
| 4 | BILLING COUNTER |
| : | : |

FIG.8D DEVICE LATEST RECEPTION HISTORY

| PK | LATEST RECEPTION DATE AND TIME |
|---|---|
| 100 | 2015/05/01 09:10:24 |
| 200 | 2015/05/01 11:20:30 |

FIG.8E STOP CANDIDATE LIST

| DEVICE ID | PK | STOP SETTING | STATE FLAG | REGISTRATION DATE AND TIME | STOP SETTING DATE AND TIME |
|---|---|---|---|---|---|
| BBB00001 | 200 | 1 | | 2015/05/02 09:00:01 | 2015/xx/xx xx:xx:xx |
| : | : | : | : | : | : |

FIG.8F PARAMETER

| PARAMETER | PERIOD (DAY) |
|---|---|
| STOP CANDIDATE EXTRACTION PROCESSING INTERVAL | 1 |
| UNREGISTERED COMMUNICATION CONTINUATION PERIOD | 180 |
| STOP INSTRUCTION CONTINUATION PERIOD | 20 |

FIG.8G STOP INFORMATION

| PK | INHIBITION SETTING |
|---|---|
| 200 | 0 (STOP OF ALL MONITORING COMMUNICATIONS) |

FIG.8H STOP SCHEDULE INFORMATION

| PK | DATA TYPE | VALID/INVALID | NOTIFICATION INTERVAL (HOUR) | NOTIFICATION TIME (GMT) |
|---|---|---|---|---|
| 200 | BILLING COUNTER | 0 | | |
| 200 | COMMAND INQUIRY COMMUNICATION | 0 | | |

FIG.13A

COMMUNICATION INHIBITION SETTING

| INHIBITION SETTING | COMMUNICATION STOP OR RESTRAINING METHOD |
|---|---|
| 0 | ALL-COMMUNICATION STOP COMMAND |
| 1 | SCHEDULE EQUIVALENT TO STOP |
| 2 | INSTRUCTION EQUIVALENT TO STOP CAUSED BY SCHEDULE (EXTENSION OF NOTIFICATION INTERVAL) |
| 3 | SPECIFIC COMMUNICATION STOP COMMAND |
| 4 | FILTERING OPERATION COMMAND |
| ⋮ | ⋮ |

FIG.13B

SCHEDULE INFORMATION

| PK | DATA TYPE | VALID/ INVALID | NOTIFICATION INTERVAL (HOUR) | NOTIFICATION TIME (GMT) |
|---|---|---|---|---|
| 200 | BILLING COUNTER | 1 | 4320 | 2xxx-07-xx 0:10:00 |
| ⋮ | COMMAND INQUIRY COMMUNICATION | 1 | 240 | 2xxx-07-xx 0:20:00 |

MONITORING SYSTEM AND METHOD

BACKGROUND OF THE INVENTION

Field of the Invention

Aspects of the embodiments generally relate to a monitoring system which includes a device placed in a client environment and a management apparatus arranged to monitor the device, and a method for the monitoring system.

Description of the Related Art

In a conventional method for managing a device using a management apparatus, a placement operation for placing the device and a connectivity test for confirming communication with the management apparatus are performed by a service engineer. To remotely manage the device, unique identification information, such as a device identifier (ID), belonging to the device is registered with the management apparatus, so that the device and the management apparatus are linked with each other to enable starting the management. If the order of a communication operation for connectivity test from the device and a registration operation for registration with the management apparatus is set to be fixed, the adjustment of schedule of a service engineer's visit and an operation for registration with the management apparatus would become required. In particular, there is a case where the registration is required to be performed only after the conclusion of a contract with a client, and, in such a case, it seems that the adjustment of schedule is not so easy.

Japanese Patent Application Laid-Open No. 2013-114654 discusses a structure which requires no consideration of the order of the placement of a device and the registration of the device with a management apparatus.

However, a conventional structure, such as that mentioned above, in which, to manage a device, a communication with a management apparatus is started at the time of the placement of the device and, after that, the device is registered with the management apparatus to start the management is premised on the assumption that the device be registered.

Furthermore, in a conventional technique, in a case where a device is still unregistered, the device re-sends a registration request until the device receives a response indicative of the completion of registration, so that the absence of registration can be prevented from being left uncontrolled. Therefore, the conventional technique would not be able to deal with such an actually occurring case that a service engineer's placement operation is incomplete or the management is stopped due to a client's situation. If a device which would repeat, for example, a registration request is left uncontrolled, a communication resource of the management apparatus may be wastefully consumed.

SUMMARY OF THE INVENTION

According to an aspect of embodiments, a monitoring system includes one or more devices and a management apparatus including a registration unit configured to register information which includes identification information of a device to be targeted for monitoring and is used for managing the device, wherein each of the devices includes an initiation unit configured to, in response to a user operation performed when the device itself is placed in a client environment, perform a communication, which includes identification information of the device, for initiating monitoring by the management apparatus, from the device to the management apparatus, and wherein the management apparatus includes a management unit configured to manage a communication history of one or more communications that were performed from each device to the management apparatus, an extraction unit configured to, in a case where there are one or more devices information about which is not registered by the registration unit and the managed communication history about which indicates that one or more communications were performed, extract a device which satisfies a predetermined condition from among the one or more devices, and a control unit configured to perform processing for inhibiting a communication that is performed from the extracted device.

Further features of the aspect of the embodiments will become apparent from the following description of exemplary embodiments with reference to the attached drawings.

BRIEF DESCRIPTION OF THE DRAWINGS

FIG. 7 illustrates an example of a registration screen used to register a device with the management apparatus.

FIGS. 8A, 8B, 8C, 8D, 8E, 8F, 8G, and 8H illustrate examples of tables used in a first exemplary embodiment.

FIGS. 13A and 13B illustrate examples of tables used in a second exemplary embodiment.

DESCRIPTION OF THE EMBODIMENTS

Various exemplary embodiments, features, and aspects of the disclosure will be described in detail below with reference to the drawings.

Figure 1:
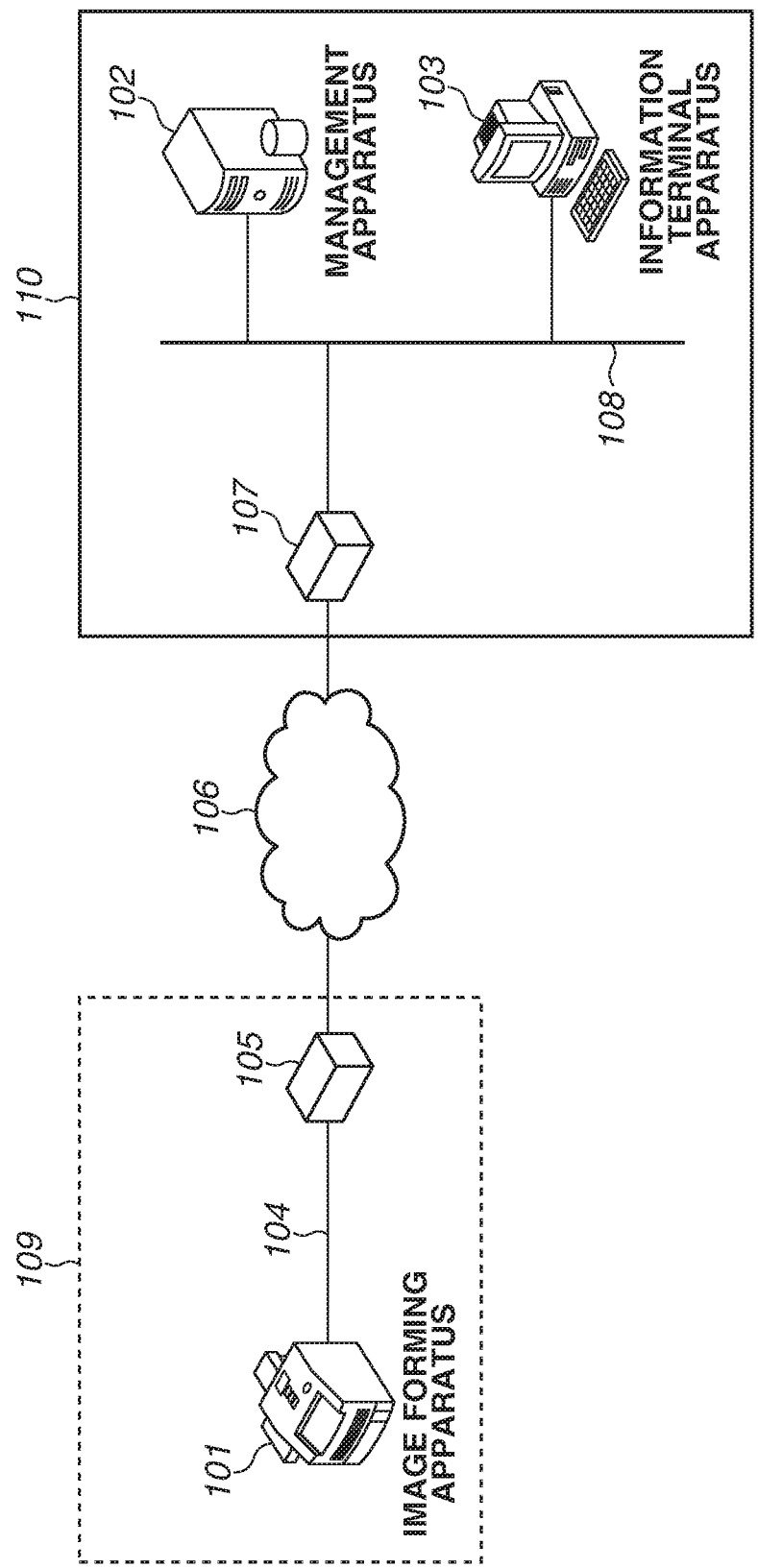
FIG. 1 is a configuration diagram of a device monitoring system according to an exemplary embodiment of the disclosure.

FIG. 1 illustrates an example of a configuration of a device monitoring system according to a first exemplary embodiment of the disclosure.

Referring to FIG. 1, a device 101, which is, for example, an image forming apparatus, is placed in a client environment 109. A network 104 is, for example, a local area network (LAN). The device 101 is connected to network equipment 105, such as a proxy server or a firewall, via the network 104. The device 101 is connectable from the client environment 109 to an external network 106 via the network 104 and the network equipment 105. Furthermore, while, in FIG. 1, only one device 101 is illustrated in the client environment 109, usually, a plurality of devices 101 is placed in the client environment 109. Moreover, there can be a plurality of such client environments 109.

A management apparatus 102 is placed in, for example, a data center 110. A network 108 is, for example, a local area network (LAN). The management apparatus 102 is connected to network equipment 107, such as a proxy server or a firewall, via the network 108. The management apparatus 102 is connectable to the external network 106 via the network 108 and the network equipment 107.

The management apparatus 102 is able to communicate with the device 101 via the external network 106. The management apparatus 102 performs remote monitoring of devices, such as operations of receiving and managing information transmitted from the device 101 and dispatching a service engineer according to, for example, the state of the device 101 or the repair in case of malfunction.

An information terminal apparatus 103 is an information processing apparatus, such as a personal computer, which is connected to the management apparatus 102 via the network 108 and is able to refer to and perform setting on information stored in the management apparatus 102. Furthermore, the information terminal apparatus 103 is able to cause the management apparatus 102 to issue an instruction to the device 101.

The network 106 can be any communication medium, such as a LAN, a fixed-line phone line, a mobile phone line, an exclusive line, and the Internet, as long as it is available for communication.

The device monitoring system according to the present exemplary embodiment, which has a configuration such as that illustrated in FIG. 1, performs monitoring of a device, such as a printer, a copying machine, or a multifunction peripheral, using a network communication. The device monitoring system performs control to inhibit communication with respect to a device deemed not to be targeted for management, based on a communication condition of the device and a condition of registration required for management of the device. Furthermore, in the first exemplary embodiment, control to inhibit communication employs a configuration of performing control to stop a communication from a device. In a second exemplary embodiment, which is described below, control to inhibit communication employs a configuration of performing control to stop a communication from a device and to reduce the communication by means other than stopping. In the following description, it is supposed that the term "inhibiting a communication" includes stopping a communication.

Figure 2:
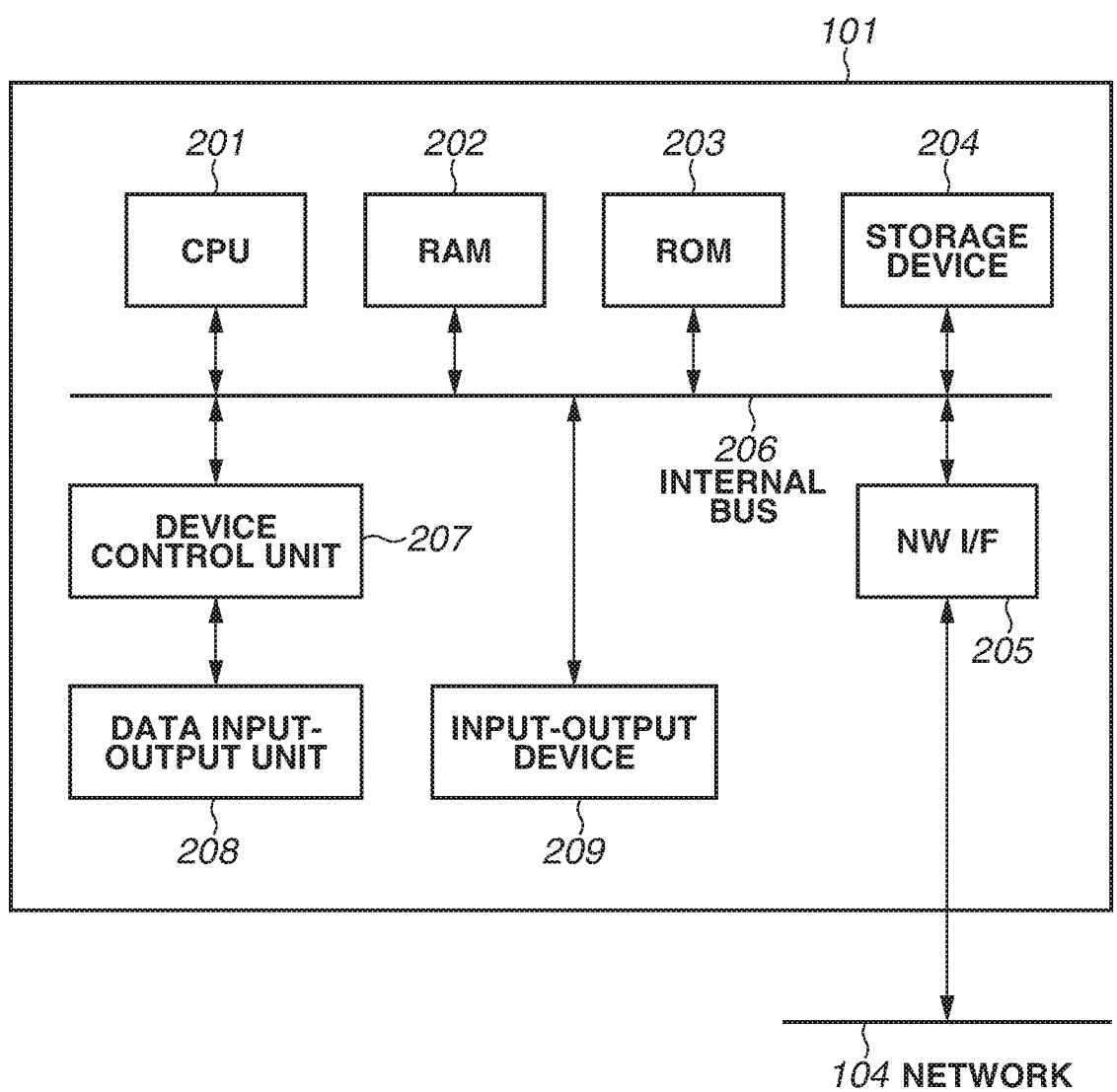
FIG. 2 is a hardware configuration diagram of a device.

FIG. 2 illustrates an example of a hardware configuration of the device 101.

The device 101 is an apparatus equipped with, for example, consumables, such as a multifunction peripheral (MFP), a printer, a facsimile apparatus, a scanner apparatus, a monitoring camera, a projector, and a navigation system. Moreover, the device 101 can be, for example, a network home electrical appliance, such as a television set, a hard disk recorder, and an air conditioner. In FIG. 2, a multifunction peripheral is illustrated by way of example.

The device 101 includes a central processing unit (CPU) 201, which executes programs (including, for example, programs for implementing various processing units illustrated in FIG. 4 described below) stored in a read-only memory (ROM) 203. Moreover, the device 101 further includes, for example, a random access memory (RAM) 202, the ROM 203, a storage device 204, a device control unit 207, a data input-output unit 208, a network interface (NW I/F) 205, and an input-output device 209. The CPU 201 comprehensively controls various units via an internal bus 206.

The RAM 202 functions as a memory or work area for the CPU 201. The ROM 203 is a flash ROM. The storage device 204 is a non-volatile storage device, such as a hard disk device or a solid-state drive. The ROM 203 and the storage device 204 serve as external storage devices and are capable of storing, besides programs to be executed by the CPU 201, print data, counter information, system information, and sensor information obtained by the device control unit 207.

The device control unit 207 controls the data input-output unit 208, which includes a printing unit and a scanner unit. The NW I/F 205 is an interface for connection with, for example, the network 104. The input-output device 209 is used to, for example, perform settings of the device 101, display statuses, and perform an operation, and is, for example, an operation panel equipped with, for example, a touch panel liquid crystal and operation keys. The service engineer and the user are allowed to use the input-output device 209 to perform an operation on the device 101 and perform an operation for connection setting or connection check with respect to the management apparatus 102 besides the operation on the device 101.

Furthermore, the above-mentioned device control unit 207 not only controls the data input-output unit 208 but also is capable of acquiring a progress situation of printing or document reading from sensors mounted in the printing unit and the scanner unit included in the data input-output unit 208 and acquiring, for example, a status and counter information about the data input-output unit 208. Such acquired pieces of information can be transmitted by the CPU 201 from the NW I/F 205 to the management apparatus 102 via the network 104 as appropriate.

Figure 3:
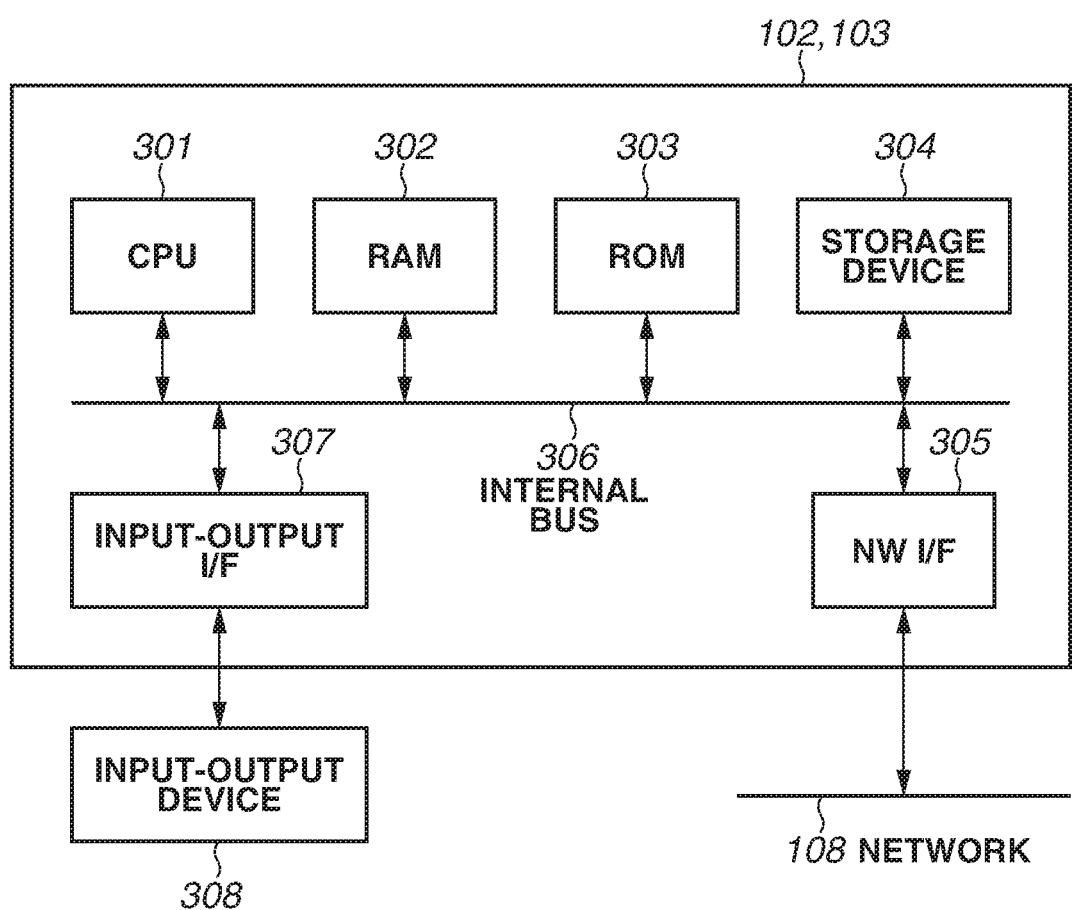
FIG. 3 is a hardware configuration diagram of a management apparatus and an information terminal apparatus.

FIG. 3 illustrates an example of a hardware configuration of the management apparatus 102 and the information terminal apparatus 103.

The management apparatus 102 is an apparatus configured to remotely monitor and manage the device 101. The management apparatus 102 includes a CPU 301, which executes programs (including, for example, programs for implementing various processing units illustrated in FIG. 5 described below) stored in a ROM 303, and comprehensively controls various units via an internal bus 306.

The various units including the CPU 301, a RAM 302, the ROM 303, a storage device 304, a network interface (NW I/F) 305, and an input-output interface (input-output I/F) 307 are interconnected via the internal bus 306.

The RAM 302 functions as a memory or work area for the CPU 301. The ROM 303 is a flash ROM. The storage device 304 is a non-volatile storage device, such as a hard disk device or a solid-state drive. The ROM 303 and the storage device 304 serve as external storage devices and are capable of processing and storing, besides programs to be executed by the CPU 301, registration information about the device 101 targeted for management and received information about a device.

The NW I/F 305 is an interface for connection with, for example, the network 108. The NW I/F 305 communicates with the device 101 connected to the external network via the network 108 to exchange data. The input-output I/F 307 controls inputs and outputs from and to an input-output device 308 so as to perform setting and management on the management apparatus 102. The input-output device 308 includes, for example, a display, a keyboard, and a pointing device.

Furthermore, in the management apparatus 102, besides the input-output device 308, the same operation as the operation that is performed on the input-output device 308 can be performed on the information terminal apparatus 103, which is connected via the NW I/F 305 and the network 108, by way of a management application or web server of the management apparatus 102. The management application or web server refers to a function capable of performing setting or management via a network using, for example, Hypertext Transfer Protocol Secure (HTTPS), which is a standard technology, or a dedicated protocol.

Next, a module configuration of the device 101 is described with reference to FIG. 4.

Figure 4:
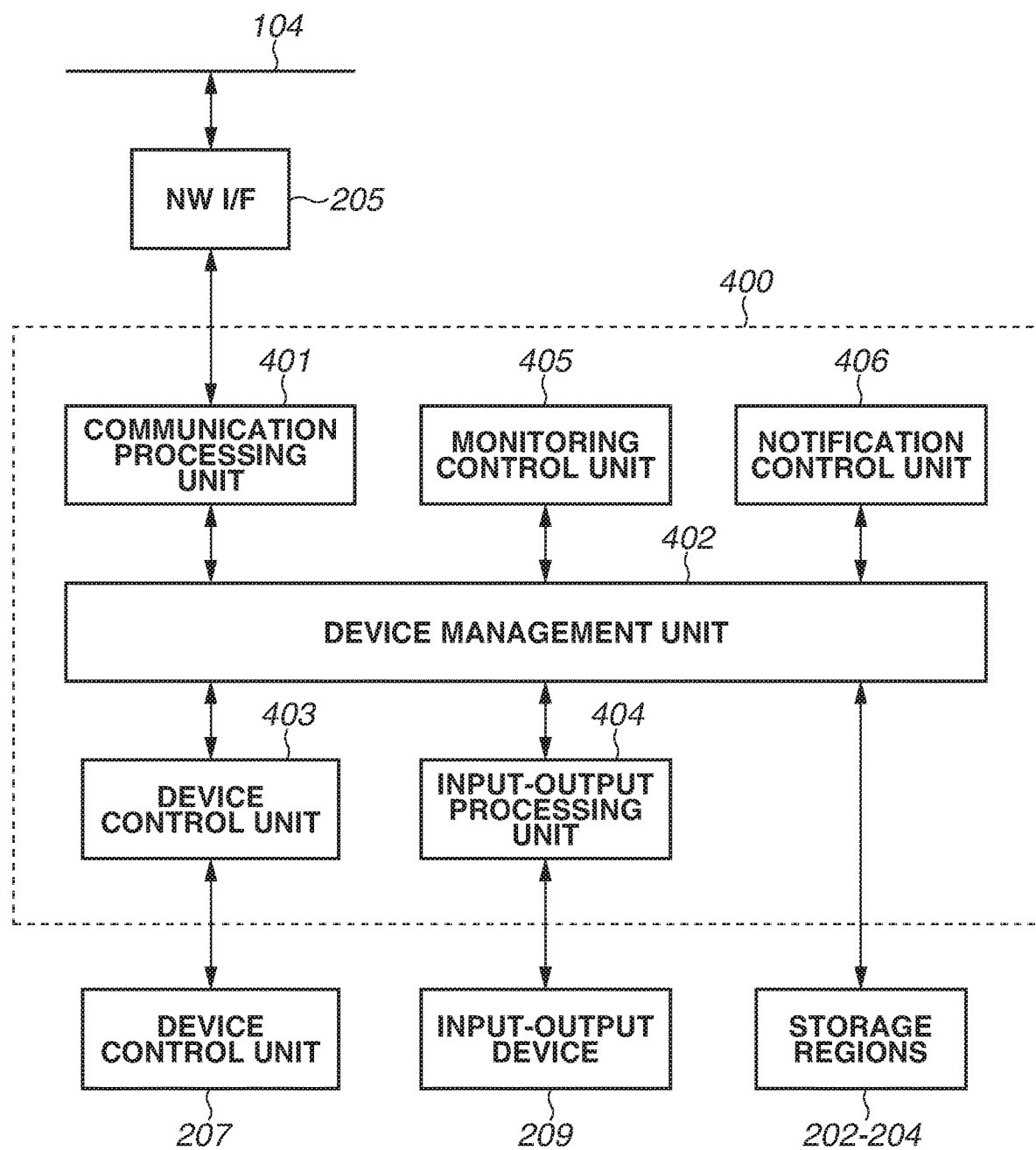
FIG. 4 is a processing module configuration diagram of the device.

FIG. 4 illustrates an example of a processing module configuration of the device 101. Furthermore, various processing modules illustrated in FIG. 4 are mounted as software and are implemented by the CPU 201 executing programs stored in, for example, the ROM 203 and the storage device 204.

Referring to FIG. 4, the device 101 includes a processing module group 400. The device 101 is connected to the network 104 via the NW I/F 205. The NW I/F 205 is controlled by instructions from a communication processing unit 401 and a device management unit 402, which controls the device 101, and exchanges information with the management apparatus 102, which is an external apparatus.

The communication processing unit 401 has a function to process a communication protocol used to communicate with the management apparatus 102. The communication protocol includes, for example, Simple Network Management Protocol (SNMP) and Simple Object Access Protocol (SOAP). Furthermore, the communication protocol does not need to be a normal standard, but can be a unique protocol. The communication processing unit 401 provides data for processing, which is described below, to the device management unit 402 according to a protocol defined by the device 101 and the management apparatus 102.

Next, the device management unit 402 is described.

The device management unit 402, which is provided for the control of the entire device 101, controls the device 101 in cooperation with other modules. The device management unit 402 cooperates with the communication processing unit 401, a device control unit 403, an input-output processing unit 404, a monitoring control unit 405, and a notification control unit 406. Moreover, the device management unit 402 exchanges information with storage regions, such as the RAM 202, the ROM 203, and the storage device 204.

The device management unit 402 not only controls the device 101 but also controls transmission of information for device management to the management apparatus 102 and reception of an instruction from the management apparatus 102. Besides device status information acquirable by the device control unit 207, the device management unit 402 handles information processed by the communication processing unit 401 and the input-output processing unit 404 as the information for device management. When transmitting these pieces of information to the management apparatus 102, the device management unit 402 performs control to also transmit device-unique information or setting information available for uniquely indentifying the device 101 (for example, Internet Protocol (IP) address, media access control (MAC) address, device serial number, product name, and product type) together. This enables the management apparatus 102 to uniquely discriminate the device 101.

The device control unit 403 is a module provided for the control of the device control unit 207, and is able to acquire, for example, counter information indicative of the number of printed sheets or consumable parts or status information about consumables stored in the data input-output portion 208 via the device control unit 207 and to provide the acquired information to the device management unit 402.

The input-output processing unit 404 performs input-output processing on the input-output device 209 for performing setting or changing of setting information for operation of the device 101 or notification processing for the management apparatus 102.

The monitoring control unit 405 performs control to acquire information for monitoring to be transmitted to the management apparatus 102, such as status information or operating information about the device 101, and to process an instruction for such acquisition. The notification control unit 406 controls information setting and notification timing for a communication target according to an instruction from the management apparatus 102. The monitoring control unit 405 performs control to acquire status information or operating information about the device 101 at timing when notification is required according to an instruction from the notification control unit 406, and to also cause the communication processing unit 401 via the device management unit 402 to transmit the acquired information to the management apparatus 102. Furthermore, the information to be transmitted to the management apparatus 102 is once stored in the storage region, such as the RAM 202, the ROM 203, or the storage device 204, via the device management unit 402 and is then transferred to, for example, the communication processing unit 401.

Furthermore, when the device 101 is placed, to perform a communication for initiation of placement (hereinafter referred to as a "placement initiation communication") serving also as a connectivity test, the monitoring control unit 405 is able to cause the input-output device 209 via the input-output processing unit 404 to display an operation screen for the placement initiation communication and to cause a service engineer who carries out placement to perform a communication for connectivity test. The operation screen for the placement initiation communication is described below with reference to FIGS. 6A, 6B, and 6C.

Next, a module configuration of the management apparatus 102 is described with reference to FIG. 5.

Figure 5:
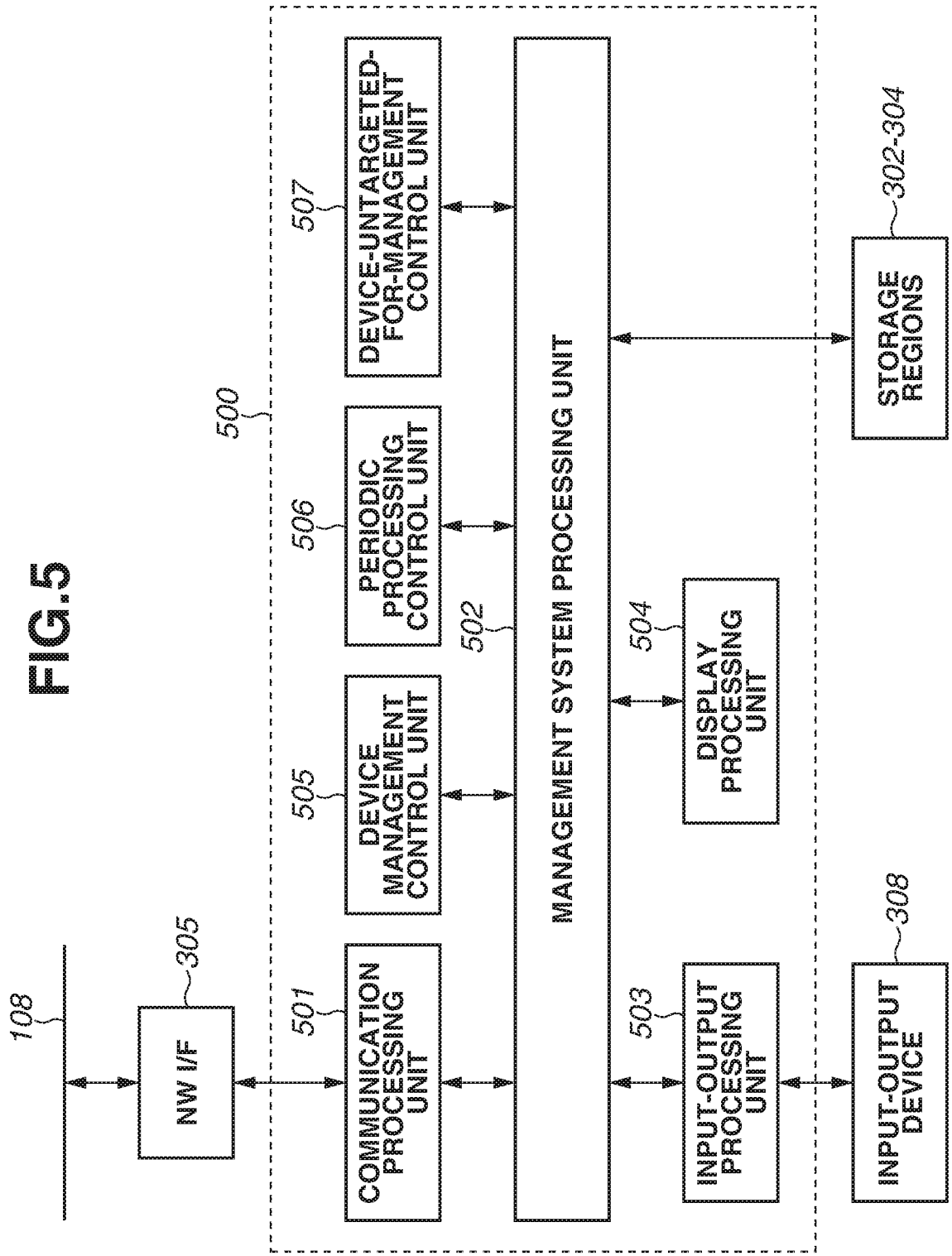
FIG. 5 is a processing module configuration diagram of the management apparatus.

FIG. 5 illustrates an example of a processing module configuration of the management apparatus 102. Furthermore, various processing modules illustrated in FIG. 5 are mounted as software and are implemented by the CPU 301 of the management apparatus 102 executing programs stored in, for example, the ROM 303 and the storage device 304.

Referring to FIG. 5, the management apparatus 102 includes a processing module group 500. A communication processing unit 501 is connected to the network 108 via the NW I/F 305. The communication processing unit 501 performs processing for exchanging information with devices 101 targeted for monitoring and scheduled to be targeted for monitoring according to an instruction from a management system processing unit 502, which controls the entirety of the management apparatus 102. The communication processing unit 501 has a function to process communication protocols, and is provided with a communication protocol prepared for the device 101, such as SOAP mentioned with reference to FIG. 4, to receive and process a notification transmitted from the device 101. The communication protocol does not need to be a normal standard, but can be a unique protocol.

The management apparatus 102 is configured to register and manage device-unique information or setting information available for uniquely indentifying the device 101 (for example, IP address, MAC address, device serial number, and product name), described above with reference to FIG. 4, and is thus able to perform processing for each device.

The information for communication processed by the communication processing unit 501 is recorded by the management system processing unit 502 on the ROM 303 or the storage device 304, which is a storage region. The information recorded in this way is able to be displayed by an input-output processing unit 503 on the input-output device 308, which is, for example, a display.

A display processing unit 504 is able to generate display information in a display language, such as HyperText Markup Language (HTML). The communication processing unit 501 is able to provide the display information to an external apparatus, such as the information terminal apparatus 103, via the NW I/F 305. The display information includes, for example, a screen used for registering the device 101 (for example, a screen illustrated in FIG. 7 described below), a registration condition of the device 101 managed by the management apparatus 102, and received device information.

The management of devices 101 is performed by a device management control unit 505. The device management control unit 505 performs control for management of the device 101 targeted for monitoring. More specifically, the device management control unit 505 controls linking between the device 101 and the information received from the device 101 and inputting and outputting of such information to and from a storage region, such as the RAM 302, the ROM 303, or the storage device 304, based on the above-mentioned device-unique information or setting information available for uniquely indentifying the device 101.

The management system processing unit 502 serves to provide information managed by the device management control unit 505 to another processing unit.

A periodic processing control unit 506 periodically performs previously defined processing. This processing is referred to as "periodic processing". The periodic processing refers to performing batch processing on a plurality of devices, such as aggregate processing of data about devices 101 received within a previous given period of time. Moreover, in the periodic processing, the periodic processing control unit 506 not only performs processing for devices 101 targeted for management, but also performs deletion of unnecessary data about a device 101 excluded from targets of monitoring or checking of a device 101 for which monitoring is not initiated (there is no registration) but communication is occurring. For example, the periodic processing control unit 506 also extracts a device 101 satisfying a predetermined condition and deemed to be untargeted for management.

A device-untargeted-for-management control unit 507 controls processing on a device 101 satisfying a predetermined condition and deemed to be untargeted for management, which has been extracted by the above-mentioned checking performed by the periodic processing control unit 506. For example, in a case where a communication is occurring in a device 101 deemed to be untargeted for management, the device-untargeted-for-management control unit 507 takes measures to stop or restrain the communication so as to prevent the resource of the management apparatus 102 from being wastefully consumed. The device-untargeted-for-management control unit 507 causes the device management control unit 505 via the management system processing unit 502 to issue an instruction to a device 101 from which a communication is being received via the communication processing unit 501 to stop the communication or restrain the communication.

Next, processing for initiating monitoring of a device in the device monitoring system is described with reference to FIGS. 6A to 6C and FIG. 7.

Figure 6A:
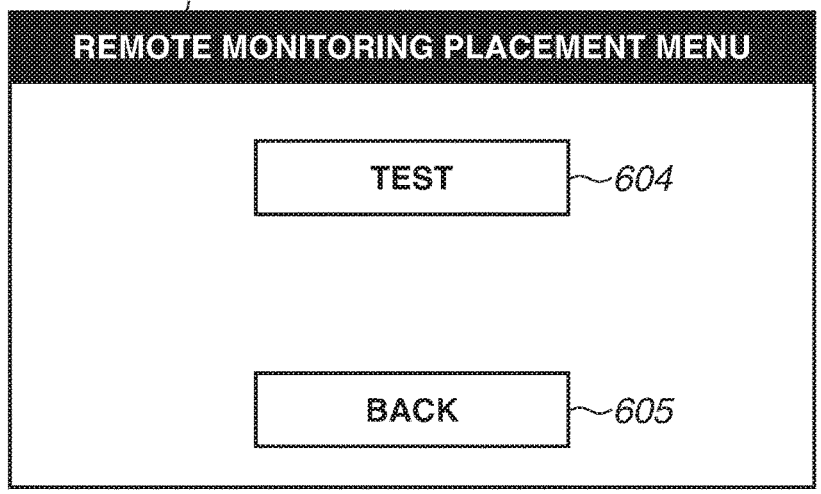
FIGS. 6A, 6B, and 6C illustrate examples of operation screens used to perform a communication for placement initiation as well as a connectivity test.
Figure 6B:
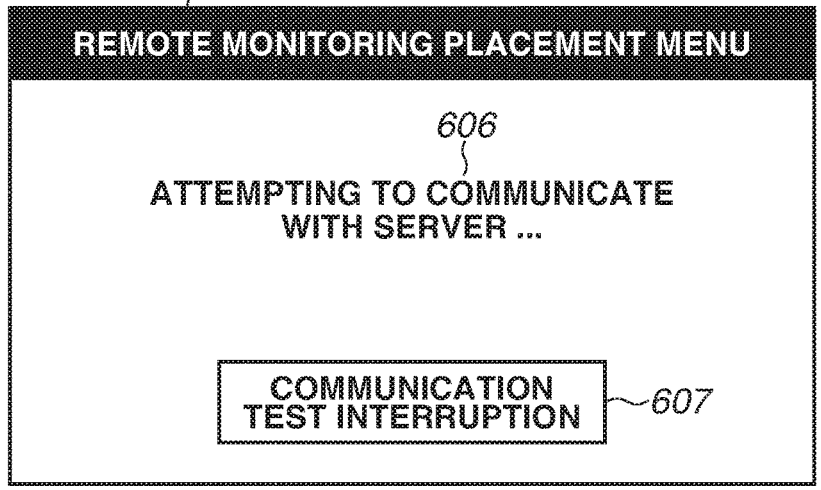
Figure 6C:
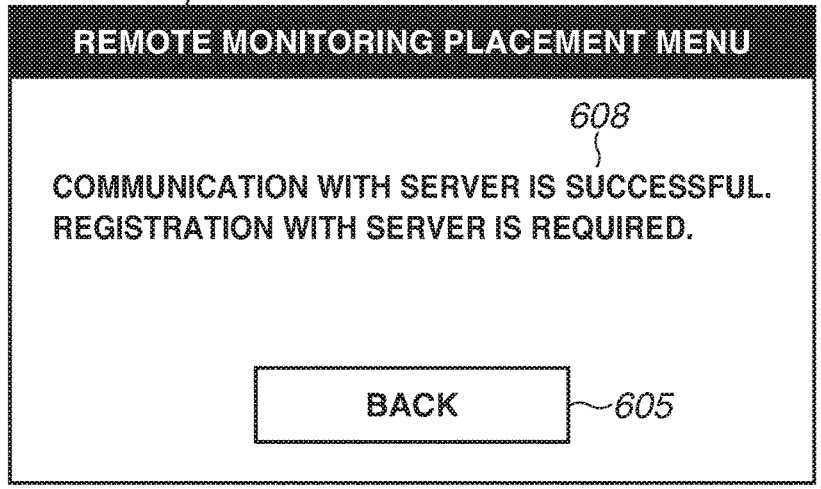

FIGS. 6A to 6C illustrate examples of operation screens used to perform the above-mentioned communication for initiation of placement (placement initiation communication) serving also as a connectivity test. Each of the screens illustrated in FIGS. 6A to 6C is displayed on the input-output device 209 under the control of, for example, the device management unit 402 and the input-output processing unit 404.

The initial display for performing the placement initiation communication is set to a state in which the screen 601 illustrated in FIG. 6A is displayed. For example, when a predetermined operation is performed by, for example, a service engineer via the input-output device 209, the screen 601 illustrated in FIG. 6A is displayed on the input-output device 209.

As illustrated in FIG. 6A, the screen 601 includes a Test button 604 and a Back button 605. The Back button 605 is a button that is selected to cease the placement initiation operation in the screen 601. Furthermore, a screen displayed after a returning operation performed via the Back button 605 is omitted from the description.

The Test button 604 is a button that is used to start a placement initiation communication with the management apparatus 102 (serving also as a confirmation of communication with the management apparatus 102). When the Test button 604 is operated, the device 101 starts the placement initiation communication (a communication associated with placement of a device) using, for example, network information and authentication information, which are previously set by other setting functions, and a Uniform Resource Locator (URL) of the management apparatus 102, which is a connection destination. In other words, the Test button 604 is a button serving as a trigger to start device management, and the user can operate the Test button 604 to perform a communication for starting a monitoring service performed by the management apparatus 102. Furthermore, it is supposed that the information previously set by other setting functions is stored in the ROM 203 or the storage device 204. When the placement initiation communication is started, the screen display is changed to the screen 602 illustrated in FIG. 6B. In the screen 602, an indication 606 indicates that the device 101 is attempting to perform a communication with the management apparatus 102.

The placement initiation communication can be stopped by operating a Communication Test Interruption button 607. When processing for the placement initiation communication is completed, the screen display is changed to the screen 603 illustrated in FIG. 6C. The screen 603 is a screen for displaying a result of the placement initiation communication.

A result 608 of the placement initiation communication is displayed in the screen 603 to enable checking whether the setting is correct and the communication with the management apparatus 102 is successful. In a case where the communication has not been correctly performed or the processing for the placement initiation communication has not been normally terminated due to a trouble of the management apparatus 102, an error message is displayed in the result 608, thus notifying the service engineer or user, who has operated the Test button 604, of that effect.

Furthermore, in the placement initiation communication, not only the confirmation of line connectivity but also the information for management, such as an instruction for information subjected to notification, a notification time, and a notification interval, is transmitted as a reply from the management apparatus 102 to the device 101. According to these pieces of information, the device 101 then starts a communication of information for management (a communication of information for device monitoring by the management apparatus 102).

Next, an operation for starting device management at the management apparatus 102 is described with reference to FIG. 7.

FIG. 7 illustrates an example of a device registration screen according to the present exemplary embodiment. The screen illustrated in FIG. 7 is displayed on, for example, the input-output device 308 of the information terminal apparatus 103 under the control of the display processing unit 504 of the management apparatus 102.

In order to specify who manages the device 101 in what way, the device registration screen illustrated in FIG. 7 is used to register, with the management apparatus 102, unique identification information belonging to the device 101 and e-mail addresses of a distributor firm, a service firm, a person in charge, and a service engineer. This registration enables specifying the user who manages the information transmitted from the device 101 and dispatching a service engineer in case of trouble. Moreover, such registration information enables performing processing for tallying devices targeted for management by the same distributor firm. A information group that is registered with the management apparatus 102 is not limited to the contents illustrated in FIG. 7, but only to include information for uniquely identifying the device 101 so as to be monitored by the management apparatus 102 and information for such management.

Furthermore, in a case where an information group about the device 101 such as that illustrated in FIG. 7 is not registered with the management apparatus 102, since it is impossible to associate the device 101 with a distributor firm or service firm which serves as a management source for managing the device 101, the management apparatus 102 is not able to provide a display or notification regarding the received communication. Therefore, since, even when accumulating status information or operation information history received from the device 101, the management apparatus 102 is not able to specify the management source, the management apparatus 102 is hardly able to perform the subsequent processing. Moreover, if, to avoid the occurrence of such a situation, the device 101 is registered with the management apparatus 102 prior to placing the device 101, in a case where the device 101 is placed erroneously before being registered, a placement initiation communication is re-performed at the placement destination after registration with the management apparatus 102. To avoid the occurrence of such a situation, timing between a device delivery and placement operation and a device registration operation is adjusted, but it is not easy to perform such timing adjustment in an actual practice.

In the management apparatus 102 according to the present exemplary embodiment, even if an order in which the placement and the placement initiation communication of the device 101 are first performed and the registration with the management apparatus 102 is then performed is employed, information indicating a partial communication history and a date and time of communication of a device 101 that is in an unregistered state is recorded by the management apparatus 102 while being associated with unique identification information about the identifiable device 101. Then, when the registration of the device 101 is later performed, the management apparatus 102 associates the registered device 101 with the above-mentioned history information associated with unique identification information about the identifiable device 101, thus enabling starting monitoring of the device 101.

However, in such a configuration, although the convenience of placement is enhanced, since a communication with the management apparatus 102 occurs even if the device 101 is in an unregistered state, in a case where the unregistered state continues for a long period, a resource belonging to the management apparatus 102 may be wasted. However, in a case where, for example, the Internet intervenes, since a firewall may prevent a communication instruction from being remotely given to a device, there is a reason why the communication has to be continued. If the communication is continued, even when receiving an inquiry from the device 101, the management apparatus 102 is able to issue an instruction to the device 101. Thus, since there is a case where a communication is continued even in a device 101 that is in an unregistered state, control operations are performed to reduce an unnecessary communication with respect to a device 101 that remains unregistered for a long period and continues only a communication. These control operations are described with reference to FIGS. 8A, 8B, 8C, 8D, 8E, 8F, 8G, and 8H, and subsequent figures.

FIGS. 8A to 8H illustrate examples of tables for use in the first exemplary embodiment.

The tables illustrated in FIGS. 8A to 8H are tables prepared in a database included in the management apparatus 102. Data stored in the database corresponds to data stored in the storage device 304.

FIG. 8A illustrates a registered device table.

The registered device table (FIG. 8A) is used to record unique identification information about a device 101 which performs a communication with the management apparatus 102 and information indicating a state of registration with the management apparatus 102, and includes a PK column, a Device ID column, and an Unregistered column. The PK column is provided to set a primary key (PK), which is a unique number in the database, and is linked to other table data described below. The Device ID column is provided to set unique identification information (device ID) of the device 101 which performs a communication with the management apparatus 102.

The Unregistered column is provided to set information indicating a state of registration with the management apparatus 102.

The Unregistered column of a device a communication with which is processable by the management apparatus 102 and which is registered with the management apparatus 102 has a value "0" set to indicate a registered state. On the other hand, the Unregistered column of a device a communication with which is processable by the management apparatus 102 and which is not registered with the management apparatus 102 has a value "1" set to indicate an unregistered state. The Unregistered column is updated when a registration with the management apparatus 102 is performed or when the registration state is changed.

FIG. 8B illustrates a device communication history table for recording a history of communications from the device 101, and the device communication history table includes a PK column, a Reception Date and Time column, a Data Type column, and a Determination column. The PK column is provided to set the PK of a device which has been recorded in the registered device table (FIG. 8A). The Reception Date and Time column is provided to set a date and time of reception at which a communication from the device was received. The Data Type column is provided to set a value indicating the type of data received with the communication. The Determination column is provided to set a value indicating a processing result of the communication with the device.

Furthermore, values to be set in the Data Type column are defined in a separate table (a device communication type table (FIG. 8C)) on the assumption that a device having a new function can be added. For example, a type "connectivity test" indicating a data type of the above-mentioned placement initiation communication that is performed at the time of placement of a device and a type "billing counter" indicating the number of printed sheets used after the management is started or the amount of use of specific processing are defined. Besides these, various pieces of information for management, such as a consumables counter indicating the degree of consumption of a consumable part, error information about the device 101 itself, environment-related information including temperature and humidity, firmware information, information about attachment of a connected external apparatus, and information about optional equipment, can be defined as data types.

The device communication history table (FIG. 8B) is used to record various data types as described above and also to record together determination information indicating whether the listed communication is a communication performed from a device targeted for management. The Determination column for communication history from a device that is registered with the management apparatus 102 has a recorded value "successful". On the other hand, the Determination column for communication history from a device that is not yet registered with the management apparatus 102 and is waiting for registration has a recorded value "authentication error". The Determination column of the device communication history table (FIG. 8B) is provided to record a result of determination performed at a point of time of every received communication, and is different in meaning from the above-mentioned Unregistered column of the registered device table (FIG. 8A), which indicates the latest registration state.

FIG. 8C illustrates a device communication type table for defining data types, and the device communication type table includes a Data Type column and a Data Type Definition column as mentioned above.

FIG. 8D illustrates a device latest reception history table used to record a reception date and time of a communication last received from the device 101 regardless of whether the device 101 is registered or not with the management apparatus 102, and the device latest reception history table includes a PK column and a Latest Reception Date and Time column. The PK column is provided to set the PK of a device recorded in the registered device table (FIG. 8A). The Latest Reception Date and Time column is provided to set the latest reception date and time of a communication from the device.

The device latest reception history table (FIG. 8D) is prepared one line for every device 101 regardless of whether the device 101 is registered or not with the management apparatus 102. The device latest reception history table (FIG. 8D) is used to check whether, with respect to every device 101, the device 101 is not registered with the management apparatus 102 and is continuing a communication therewith, details of which are described below.

FIG. 8E illustrates a stop candidate list table used to store information about a device targeted for communication stop (inhibition), and the stop candidate list table includes a Device ID column, a PK column, a Stop Setting column, a State Flag column, a Registration Date and Time column, and a Stop Setting Date and Time column. The Device ID column and the PK column are provided to set the device ID and the PK of a device recorded in the registered device table (FIG. 8A). The Stop Setting column of a device targeted for communication stop (inhibition) has a set value "1". The State Flag column has a value set to indicate a result of execution of the communication stop (inhibition) for the device. For example, the State Flag column of a device for which the communication stop (inhibition) is successful has a set value "1", the State Flag column of a device for which the communication stop (inhibition) is failed has a set value "2", the State Flag column of a device for which a result of the communication stop (inhibition) is unclear has a set value "3", the State Flag column of a device for which the communication stop (inhibition) has been canceled has a set value "4", and the State Flag column of a device for which setting of the communication stop (inhibition) has been canceled due to the elapse of a stop setting period has a set value "5". The Registration Date and Time column has a value set to indicate the date and time at which the device was registered in the stop candidate list table (FIG. 8E). The Stop Setting Date and Time column has a value set to indicate the date and time at which the device was set as a communication stop (inhibition) target.

FIG. 8F illustrates a parameter table used to define a setting value serving as a criterion for a communication stop target, and the parameter table includes a Parameter column and a Period (Day) column. In the example illustrated in FIG. 8F, a stop candidate extraction processing interval is defined as one day, an unregistered communication continuation period is defined as 180 days, and a stop instruction continuation period is defined as 20 days. The stop candidate extraction processing interval is a setting value used to define an interval for extracting a device serving as a communication stop (inhibition) target. The unregistered communication continuation period is a setting value used to define a period for which the unregistered state is allowed to continue from the start of communication with the device 101 until the communication stop operation is performed. The stop instruction continuation period is a setting value used to define a period for which an instruction for communication stop (inhibition) to a device serving as a communication stop (inhibition) target is continued. Furthermore, setting values other than the above-mentioned values can be defined in the parameter table (FIG. 8F).

FIG. 8G illustrates a stop information table used to record information for performing communication stop processing on the device 101 targeted for communication stop, and the stop information table includes a PK column and an Inhibition Setting column. The PK column has a value set to indicate the PK of a device recorded in the registered device table (FIG. 8A). In the case of stopping all of the monitoring communications, the Inhibition Setting column has a value "0" set to indicate that a stop command is issued to the device. Moreover, in the case of setting a stop schedule corresponding to communication stop, the Inhibition Setting column has a value "1" set to indicate a stop schedule instruction. In a case where the value "1" is set in the Inhibition Setting column, a stop schedule information table illustrated in FIG. 8H is referred to.

The stop schedule information table (FIG. 8H), which the device management control unit 505 illustrated in FIG. 5 refers to according to the value of the Inhibition Setting column, includes a PK column, a Data Type column, a Valid/Invalid column, a Notification Interval (Hour) column, and a Notification Time (GMT) column. The PK column has a value set to indicate the PK of a device recorded in the registered device table (FIG. 8A). The Notification Interval (Hour) column has a value set to indicate a notification interval. The Notification Time (GMT) column has a value set to indicate next notification time calculated from, for example, the notification interval.

The stop schedule information table (FIG. 8H) is prepared one line for every communication. When the data type of a communication intended to be stopped is set in the Data Type column and a value "0" indicating Invalid is set in the Valid/Invalid column, the communication is made invalid after the schedule instruction. In the example illustrated in FIG. 8H, the value "0" indicating Invalid is set in both the Valid/Invalid columns of the data types "Billing Counter" and "Command Inquiry Communication", and the communications for "Billing Counter" and "Command Inquiry Communication" are made invalid after the schedule instruction. Furthermore, the method for setting a stop schedule is not limited to the above method, but can be a method of setting a value defined as an invalid value in, for example, the Notification Interval (Hour) column. For example, a value "1" indicating Valid is set in the Valid/Invalid column, and a value indicating an invalid value (for example, "−1") is set in the Notification Interval (Hour) column or the Notification Time (GMT) column. These stop methods are set in such a way as to become a stop schedule at the management apparatus 102 according to the functions of the device 101.

Figure 9:
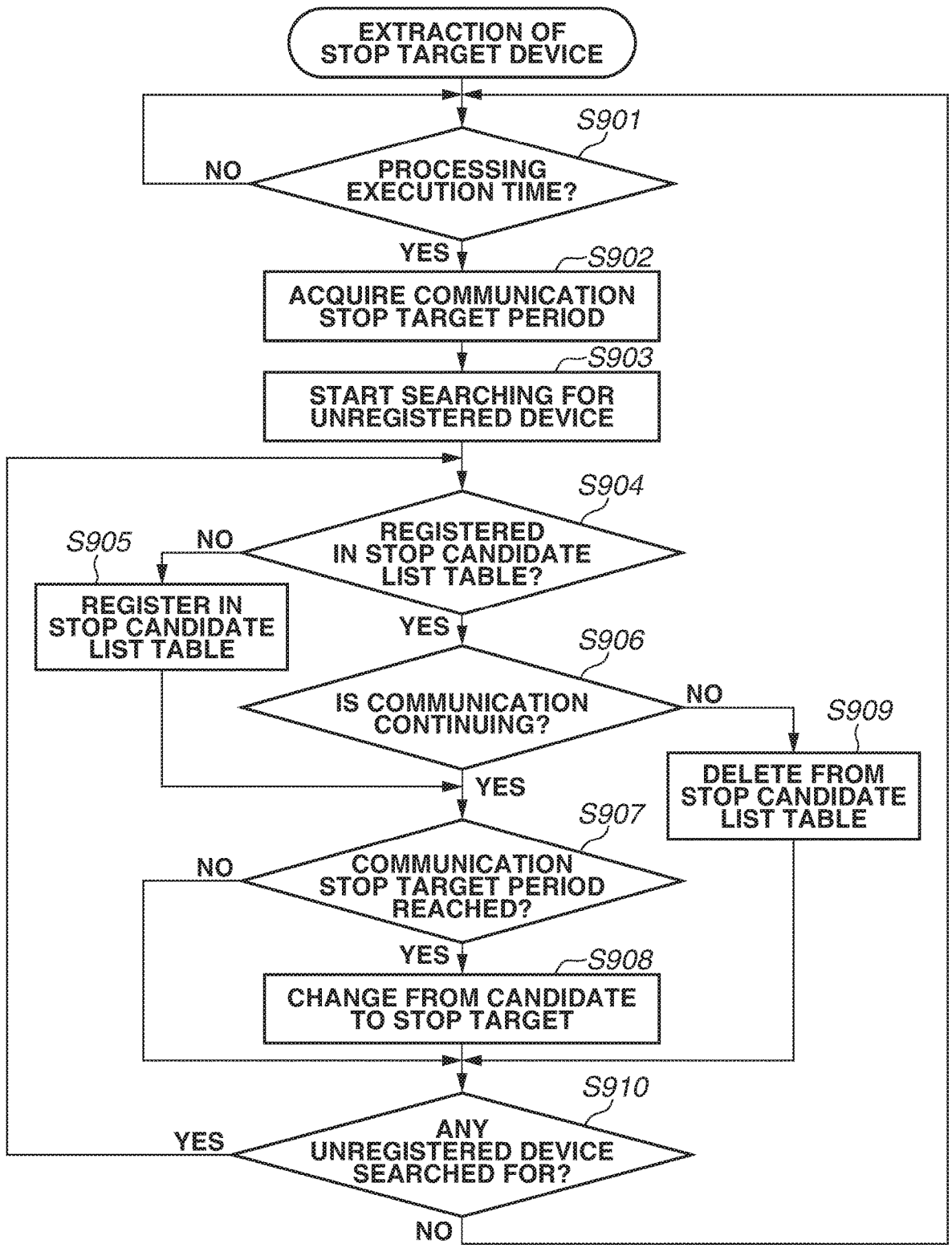
FIG. 9 is a flowchart illustrating an example of extraction processing for a communication stop target device.

FIG. 9 is a flowchart illustrating periodic processing for extracting a device 101 targeted for communication stop, which is in an unregistered state and for which a communication is continuing. Processing in the flowchart of FIG. 9 is performed by the periodic processing control unit 506 of the management apparatus 102. In other words, processing in the flowchart of FIG. 9 is implemented by the CPU 301 of the management apparatus 102 executing a program stored in, for example, the ROM 303 or the storage device 304.

In step S901, the periodic processing control unit 506 determines whether the processing execution time (the stop candidate extraction processing interval in the parameter table (FIG. 8F)), which is previously set for performing periodic processing, has been reached. This processing execution time is, for example, an interval of one day. Furthermore, in a case where a period from the placement initiation communication, which is performed at the time of placement, to the completion of registration is strictly defined, an interval of the processing execution time can be set shorter. Moreover, the interval of the processing execution time can be set variable according to the load condition of the management apparatus 102.

If, in step S901, it is determined that the processing execution time has not been reached (NO in step S901), the periodic processing control unit 506 repeats the determination in step S901 until the processing execution time has been reached. On the other hand, it is determined that the processing execution time has been reached (YES in step S901), the periodic processing control unit 506 advances the processing to step S902.

Then, in step S902, the periodic processing control unit 506 acquires, as a communication stop target period, the setting value of the "unregistered communication continuation period" from the parameter table (FIG. 8F).

Then, in steps S903 to S910, the periodic processing control unit 506 records a device 101 which is in an unregistered state and for which a communication is continuing in a list of communication stop candidates. Moreover, the periodic processing control unit 506 performs processing for changing a device 101 which has been set as a communication stop candidate for over a predetermined time from the communication stop candidate to a communication stop target. Furthermore, it is assumed that processing in steps S903 to S910 is performed in units of one device 101. Details thereof are described as follows.

First, in step S903, the periodic processing control unit 506 searches for an unregistered device from the registered device table illustrated in FIG. 8A, and sets the found one device as a processing target device. Furthermore, here, the periodic processing control unit 506 can search for only an unregistered device from which a communication was performed within a predetermined time. Moreover, although not illustrated, if, in step S903, there is no unregistered device, the periodic processing control unit 506 shifts the processing to step S901, thus waiting for next periodic processing time (not illustrated).

Then, in step S904, the periodic processing control unit 506 refers to the stop candidate list table (FIG. 8E) and checks whether the processing target device is registered therein as a communication stop candidate. If it is determined that the processing target device is not registered in the stop candidate list table (FIG. 8E) (NO in step S904), the periodic processing control unit 506 advances the processing to step S905.

In step S905, the periodic processing control unit 506 registers the processing target device in the stop candidate list table (FIG. 8E). In this case, the periodic processing control unit 506 registers the PK value of the registered device table (FIG. 8A) and the current date and time in the PK column and the Registration Date and Time column of the stop candidate list table (FIG. 8E). Furthermore, at this point, the periodic processing control unit 506 registers none in the values of the Stop Setting column, the State Flag column, and the Stop Setting Date and Time column. After processing in step S905, the periodic processing control unit 506 advances the processing to step S907.

Furthermore, although not illustrated, even if a result of the determination in step S904 is NO, in a case where the periodic processing control unit 506 refers to the device communication history table (FIG. 8B) and determines that no communication from the processing target device occurs within a predetermined period, the periodic processing control unit 506 advances the processing directly to step S910 without performing processing in step S905.

On the other hand, if, in step S904, it is determined that the processing target device is registered in the stop candidate list table (FIG. 8E) (YES in step S904), the periodic processing control unit 506 advances the processing to step S906.

Furthermore, although not illustrated, even if a result of the determination in step S904 is YES, in a case where a value is set in the State Flag column for the processing target device in the stop candidate list table (FIG. 8E), the periodic processing control unit 506 determines that an instruction for communication stop (inhibition) has already been issued to the processing target device, and, to exclude the processing target device from communication stop (inhibition) targets, advances the processing directly to step S910.

In step S906, the periodic processing control unit 506 checks whether a communication from the processing target device is continuing. In a case where a difference between the latest reception date and time of the processing target device in the device latest reception history table (FIG. 8D) and the current periodic processing start time exceeds a period deemed as the continuation of a communication, the periodic processing control unit 506 determines that a communication from the processing target device is not continuing, and, otherwise, determines that a communication from the processing target device is continuing. Furthermore, such a period deemed as the continuation of a communication can be set optionally. For example, the period deemed as the continuation of a communication depends on the usage pattern of a device and, therefore, can be set to one day (24 hours) in the case of the device not being powered off and also to one week in consideration of a case where the device is occasionally powered on. Moreover, although not illustrated, the setting value of the period deemed as the continuation of a communication can be stored in a table or as a parameter in an application.

In a case where a communication does not occur within the period deemed as the continuation of a communication, the periodic processing control unit 506 determines that a communication is not continuing (NO in step S906), and thus advances the processing to step S909. In step S909, the periodic processing control unit 506 deems that the processing target device was removed from the placement location, and, to exclude the processing target device from targets of processing for stopping a communication, deletes information about the processing target device from the stop candidate list table (FIG. 8E), then advancing the processing to step S910.

On the other hand, in a case where, in step S906, a communication occurs within the period deemed as the continuation of a communication, the periodic processing control unit 506 determines that a communication is continuing (YES in step S906), and thus advances the processing to step S907.

In step S907, the periodic processing control unit 506 checks whether the processing target device has reached the communication stop target period from when the processing target device was registered in the stop candidate list table (FIG. 8E). In a case where a difference between the registration date and time of the processing target device in the stop candidate list table (FIG. 8E) and the current periodic processing start time has reached the above-mentioned unregistered communication continuation period acquired in step S902, the periodic processing control unit 506 determines that the processing target device has reached the communication stop target period, and, otherwise, determines that the processing target device has not reached the communication stop target period.

If, in step S907, it is determined that the processing target device has not reached the communication stop target period (NO in step S907), the periodic processing control unit 506 advances the processing to step S910.

On the other hand, if it is determined that the processing target device has reached the communication stop target period (YES in step S907), the periodic processing control unit 506 determines that a condition for communication stop is satisfied, and then advances the processing to step S908.

In step S908, to change the processing target device to a stop target, the periodic processing control unit 506 sets a value "1" indicating that the processing target device is a stop target in the Stop Setting column for the processing target device in the stop candidate list table (FIG. 8E) and sets the current date and time in the Stop Setting Date and Time column thereof, then advancing the processing to step S910.

In step S910, the periodic processing control unit 506 searches for an unregistered device that is not yet set as a processing target from the registered device table illustrated in FIG. 8A, and determines whether any unregistered device has been searched for. If an unregistered device that is not yet set as a processing target has been searched for (YES in step S910), the periodic processing control unit 506 sets the found one device as a new processing target device and then shifts the processing to step S904, then continuing the processing.

On the other hand, if no unregistered device that is not yet set as a processing target has been searched for (NO in step S910), the periodic processing control unit 506 shifts the processing to step S901, then waiting for next periodic processing time.

In the above-described way, as illustrated in FIG. 9, the periodic processing control unit 506 is able to extract a device that is in an unregistered state and that is continuing a communication for monitoring for a predetermined period or more as a communication stop target.

Figure 10:
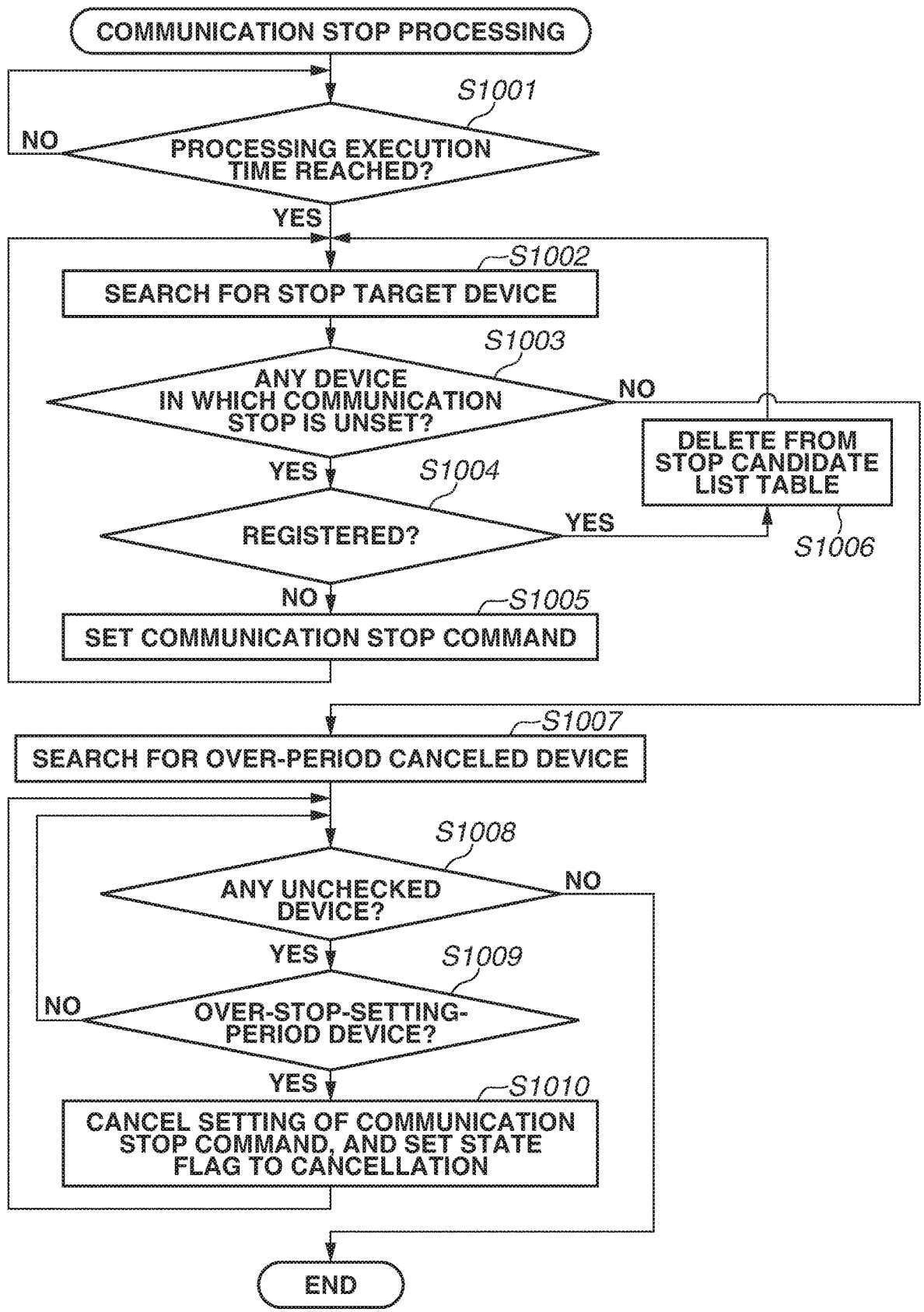
FIG. 10 is a flowchart illustrating an example of communication stop processing.

FIG. 10 is a flowchart illustrating processing for determining execution of communication stop with respect to the device 101 serving as a communication stop target extracted in the processing illustrated in FIG. 9. Processing in the flowchart of FIG. 10 is performed by the device-untargeted-for-management control unit 507 of the management apparatus 102. In other words, processing in the flowchart of FIG. 10 is implemented by the CPU 301 of the management apparatus 102 executing a program stored in, for example, the ROM 303 or the storage device 304.

In step S1001, the device-untargeted-for-management control unit 507 determines whether the processing execution time, which is a time for starting processing and is previously set for periodically performing processing, has been reached. If it is determined that the processing execution time has not been reached (NO in step S1001), the device-untargeted-for-management control unit 507 repeats the determination in step S1001 until the processing execution time has been reached. On the other hand, it is determined that the processing execution time has been reached (YES in step S1001), the device-untargeted-for-management control unit 507 advances the processing to step S1002.

In step S1002, the device-untargeted-for-management control unit 507 searches for a communication stop target device from the stop candidate list table (FIG. 8E). For example, the device-untargeted-for-management control unit 507 searches for a device with respect to which a value "1" is set in the Stop Setting column and no value is set in the State Flag column.

Then, in step S1003, the device-untargeted-for-management control unit 507 checks whether there is a device in which communication stop is unset in the devices found in step S1002. In a case where stop information about all of the found devices is set in the stop information table (FIG. 8G), the device-untargeted-for-management control unit 507 determines that there is no device in which communication stop is unset, and, otherwise, determines that there is a device in which communication stop is unset.

If, in step S1003, it is determined that there is a device in which communication stop is unset (YES in step S1003), the device-untargeted-for-management control unit 507 sets one device in which communication stop is unset as a processing target device, and then advances the processing to step S1004.

In step S1004, the device-untargeted-for-management control unit 507 checks as a precautionary measure the registration state of the processing target device with the management apparatus 102 immediately before setting a stop command or a communication stop schedule with respect to the processing target device. Then, if it is determined that the processing target device is in an unregistered state (NO in step S1004), the device-untargeted-for-management control unit 507 advances the processing to step S1005.

In step S1005, the device-untargeted-for-management control unit 507 sets any one of a stop command and a communication stop schedule for the processing target device, and then shifts the processing to step S1002. Furthermore, in the case of setting the stop command, the device-untargeted-for-management control unit 507 sets the PK of the processing target device and a value "0" in the PK column and the Inhibition Setting column of the stop information table (FIG. 8G), respectively. In the case of setting the communication stop schedule, the device-untargeted-for-management control unit 507 sets the PK of the processing target device and a value "1" in the PK column and the Inhibition Setting column of the stop information table (FIG. 8G), respectively, and further sets a schedule in the stop schedule information table (FIG. 8H). Furthermore, it is assumed that, for example, which of the stop command and the communication stop schedule to set and a communication of which of the data types to stop are previously set. Moreover, in step S1005, the device-untargeted-for-management control unit 507 can set the current date and time in the Stop Setting Date and Time column for the processing target device in the stop candidate list table (FIG. 8E).

On the other hand, if it is determined that the processing target device is registered (YES in step S1004), the device-untargeted-for-management control unit 507 advances the processing to step S1006.

In step S1006, the device-untargeted-for-management control unit 507 deletes information about the processing target device from the stop candidate list table (FIG. 8E), and then returns the processing to step S1002, thus continuing the processing.

If, in step S1003, it is determined that there is no device in which communication stop is unset (NO in step S1003), the device-untargeted-for-management control unit 507 determines that the setting of communication stop has been completed with respect to all of the communication stop target devices, and then advances the processing to step S1007.

Subsequently, in steps S1007 to S1010, the device-untargeted-for-management control unit 507 deems that, for example, a device with respect to which an instruction for inhibiting a communication was not able to be issued for a predetermined period or more was removed, and thus performs processing for excluding the device from targets to which to issue an instruction for inhibiting a communication.

First, in step S1007, the device-untargeted-for-management control unit 507 starts processing for extracting a device with respect to which communication stop processing was not able to be performed for a predetermined period for the reason that, for example, a communication from the device 101 was interrupted after communication stop setting was performed (searching for an over-period canceled device). Furthermore, the setting value of the above-mentioned stop instruction continuation period in the parameter table (FIG. 8F) is used as the above predetermined period. In this step, the device-untargeted-for-management control unit 507 searches for all of the devices with respect to which a value "1" is set in the Stop Setting column from the stop candidate list table (FIG. 8E).

Then, in step S1008, the device-untargeted-for-management control unit 507 determines whether there is an unchecked device from among the devices found in step S1007. If it is determined that there is an unchecked device (YES in step S1008), the device-untargeted-for-management control unit 507 sets one unchecked device as a check target device, and then advances the processing to step S1009.

In step S1009, the device-untargeted-for-management control unit 507 determines whether a difference between the date and time of the Stop Setting Date and Time column for the check target device in the stop candidate list table (FIG. 8E) and the current periodic processing start time has reached the stop instruction continuation period.

If the difference has not reached the stop instruction continuation period, the device-untargeted-for-management control unit 507 determines that the check target device is not an over-stop-setting-period device (NO in step S1009), and then shifts the processing to step S1008.

On the other hand, if the difference has reached the stop instruction continuation period, the device-untargeted-for-management control unit 507 determines that the check target device is an over-stop-setting-period device (YES in step S1009), and then advances the processing to step S1010.

In step S1010, the device-untargeted-for-management control unit 507 deems that the check target device was removed, and updates the Stop Setting column for the check target device in the stop candidate list table (FIG. 8E) with a value "2". Here, the value "2" indicates that communication stop has not been performed within the stop instruction continuation period. The reason of not deleting information about the over-stop-setting-period device from the stop candidate list table (FIG. 8E) is to retain, as a history, the fact that, while the communication stop condition is satisfied, processing has not been completed. Moreover, in step S1010, the device-untargeted-for-management control unit 507 cancels the setting of the stop command or the communication stop schedule of the check target device. For example, the device-untargeted-for-management control unit 507 deletes information about the check target device set in the stop information table (FIG. 8G) and the stop schedule information table (FIG. 8H). Furthermore, the device-untargeted-for-management control unit 507 records a value "5", which indicates the cancellation of setting due to the elapse of a stop setting period, in the State Flag column for the check target device in the stop candidate list table (FIG. 8E). After processing in step S1010, the device-untargeted-for-management control unit 507 shifts the processing to step S1008.

If, in step S1008, the device-untargeted-for-management control unit 507 determines that there is no unchecked device (NO in step S1008), the device-untargeted-for-management control unit 507 ends the processing in the present flowchart, and waits for next periodic processing start time.

Furthermore, the above-described processing illustrated in FIG. 9 and the processing illustrated in FIG. 10 can be performed in succession or can be performed while being staggered.

Figure 11:
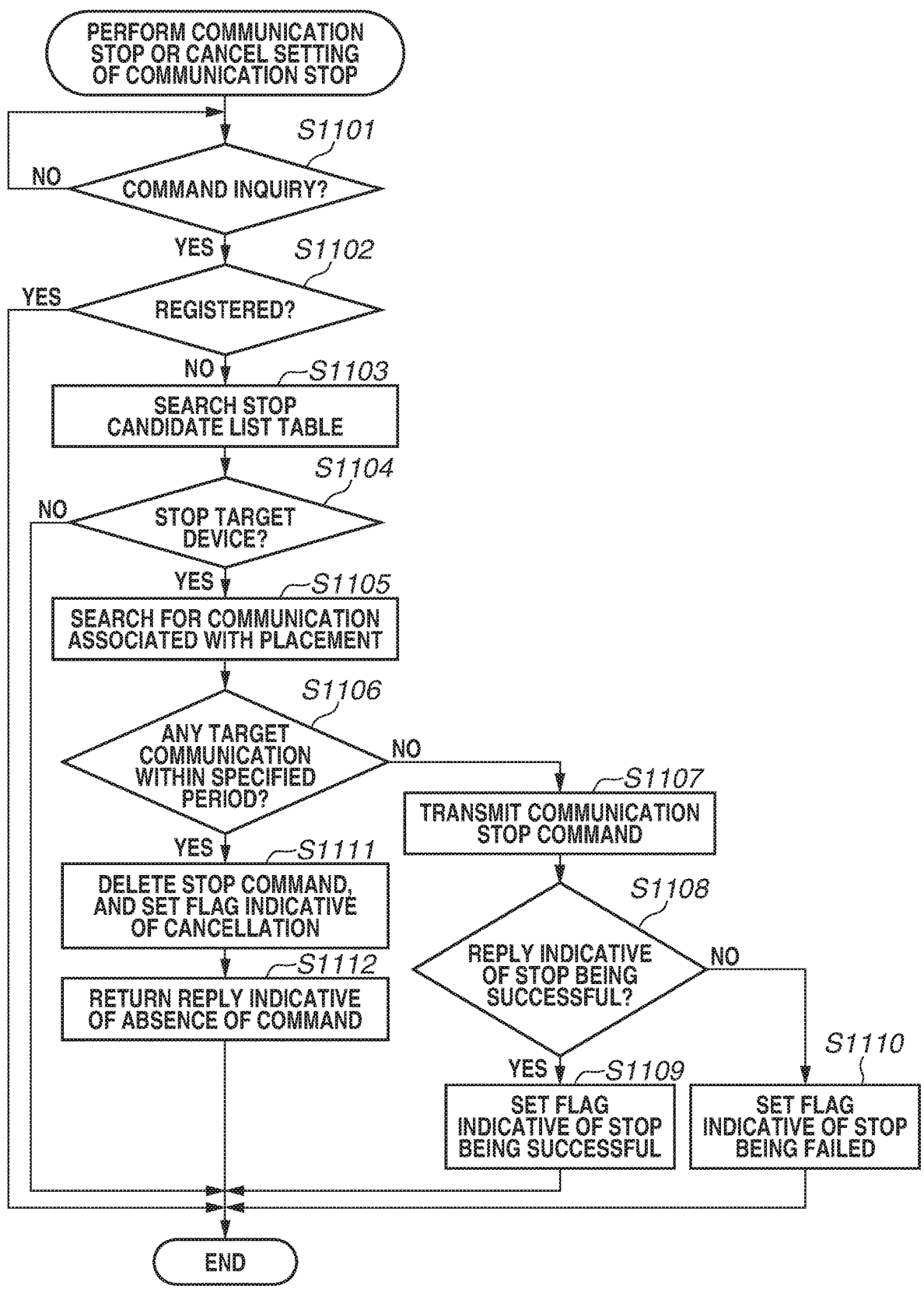
FIG. 11 is a flowchart illustrating an example of communication stop execution or communication stop cancellation processing.

FIG. 11 is a flowchart illustrating processing for performing communication stop on a device set as a communication stop target or for canceling the setting of communication stop in a case where a specific communication has been performed from a device set as a communication stop target. Processing in the flowchart of FIG. 11 is performed by the device-untargeted-for-management control unit 507 of the management apparatus 102. In other words, processing in the flowchart of FIG. 11 is implemented by the CPU 301 of the management apparatus 102 executing a program stored in, for example, the ROM 303 or the storage device 304.

In the processing illustrated in FIG. 11, an instruction for communication stop is issued to a device 101 from which an unnecessary communication is occurring for a predetermined period. However, in a case where a specific communication is received, processing for stopping execution of the instruction for communication stop is performed. The term "specific communication" refers to a communication performed only at the time of placement (for example, the placement initiation communication described with reference to FIGS. 6A to 6C).

Usually, in the case of a device that is left without being registered, a communication for transmitting a device state, such as a counter, serving as a monitoring target is continuously performed. However, a communication performed at the time of placement, for example, a communication for connectivity test performed by a service engineer who carries out placement (the placement initiation communication described with reference to FIGS. 6A to 6C), does not occur unless, for example, the service engineer performs an operation. Therefore, in a case where the communication performed at the time of placement has been performed, it is deemed that the device has become likely to be re-set as a management target instead of being uncontrolled, so that it is determined that it is no longer necessary to perform communication stop processing. This communication for connectivity test is defined as a specific communication.

In a case where a command inquiry is received from the device 101, the management apparatus 102 transmits, to the device 101, a command available for inhibiting and controlling a communication from the device 101 (for example, a command for stopping (inhibiting) a communication) as a reply to the inquiry. Upon receiving the command, the device 101 inhibits a communication with the management apparatus 102 according to the command. With such a configuration, even in a case where, for example, a firewall is placed in the client environment 109, the management apparatus 102 is enabled to transmit a command to the device 101 to control an operation of the device 101.

First, in step S1101, the device-untargeted-for-management control unit 507 checks whether a communication for command inquiry has been received from the device 101. If it is determined that no communication for command inquiry has been received from the device 101 (NO in step S1101), the device-untargeted-for-management control unit 507 repeats processing in step S1101.

On the other hand, if it is determined that a communication for command inquiry has been received from the device 101 (YES in step S1101), the device-untargeted-for-management control unit 507 advances the processing to step S1102.

In step S1102, the device-untargeted-for-management control unit 507 checks whether a device corresponding to the communication for command inquiry determined in step S1101 is registered with the management apparatus 102. This check is performed with the use of the registered device table (FIG. 8A).

If it is determined that the device corresponding to the communication for command inquiry is registered with the management apparatus 102 (YES in step S1102), the device-untargeted-for-management control unit 507 determines that no communication stop is required, and then ends the processing in the present flowchart.

On the other hand, if it is determined that the device corresponding to the communication for command inquiry is not registered with the management apparatus 102 (NO in step S1102), the device-untargeted-for-management control unit 507 advances the processing to step S1103.

In step S1103, the device-untargeted-for-management control unit 507 searches the stop candidate list table (FIG. 8E) to check whether the device is set as a stop target.

Then, in step S1104, the device-untargeted-for-management control unit 507 determines whether the device is a stop target device based on a result of the search performed in step S1103. In a case where the value of the Stop Setting column for the device in the stop candidate list table (FIG. 8E) is "1" and no value is set in the State Flag column thereof, the device-untargeted-for-management control unit 507 determines that the device is a stop target device, and, otherwise, determines that the device is not a stop target device.

If it is determined that the device is not a stop target device (NO in step S1104), the device-untargeted-for-management control unit 507 ends the processing in the present flowchart.

On the other hand, if it is determined that the device is a stop target device (YES in step S1104), the device-untargeted-for-management control unit 507 advances the processing to step S1105.

In step S1105, the device-untargeted-for-management control unit 507 searches the device communication history table (FIG. 8B) to check whether a target communication (for example, a communication associated with placement (connectivity test)) was received from the device within a target period. Furthermore, the target period is set as a period from the time of the preceding stop target processing illustrated in FIG. 9 to the time of execution of the processing in the present flowchart.

Then, in step S1106, the device-untargeted-for-management control unit 507 checks whether the target communication was received from the device 101 within a specified period based on a result of the search performed in step S1105.

If it is determined that no target communication was received within the specified period (NO in step S1106), the device-untargeted-for-management control unit 507 advances the processing to step S1107 so as to stop a communication from the device 101 as scheduled.

In step S1107, the device-untargeted-for-management control unit 507 transmits, to the device 101, a communication stop command set for the device 101. Upon receiving the communication stop command, the device 101 performs processing corresponding to the communication stop command, and then transmits a notification of a result of execution of the processing corresponding to the communication stop command ("successful" or "failed") to the management apparatus 102.

Then, in step S1108, the device-untargeted-for-management control unit 507 checks the notification of the execution result transmitted from the device 101. If it is determined that the execution result is a reply indicating that an instruction of the stop (inhibition) command is successful (YES in step S1108), the device-untargeted-for-management control unit 507 advances the processing to step S1109.

In step S1109, the device-untargeted-for-management control unit 507 sets a value "1" indicative of the success of stop (inhibition) in the State Flag column for the device 101 in the stop candidate list table (FIG. 8E), and then ends the processing in the present flowchart.

On the other hand, if, in step S1108, it is determined that the execution result is a reply indicating that an instruction of the stop (inhibition) command is failed (NO in step S1108), the device-untargeted-for-management control unit 507 advances the processing to step S1110.

In step S1110, the device-untargeted-for-management control unit 507 sets a value "2" indicative of the failure of stop (inhibition) in the State Flag column for the device 101 in the stop candidate list table (FIG. 8E), and then ends the processing in the present flowchart. Furthermore, depending on the specifications of the device 101, there may be a case where no reply is able to be returned during execution of stop (inhibition) or a case where no reply is returned due to an environmental reason, such as a communication fault. In that case, the device-untargeted-for-management control unit 507 can also determine that the result is unclear after a predetermined time and set a value "3" indicative of the result being unclear in the State Flag column for the device 101 in the stop candidate list table (FIG. 8E). Alternatively, the device-untargeted-for-management control unit 507 can return the processing to step S1101, thus waiting for a communication.

Furthermore, if, in step S1106, it is determined that the target communication was received from the device 101 within the specified period (YES in step S1105), the device-untargeted-for-management control unit 507 determines that an operation concerning placement was performed at the device 101 for the purpose of implementing monitoring as mentioned above, and then advances the processing to step S1111.

In step S1111, the device-untargeted-for-management control unit 507 deletes the communication stop (inhibition) command so as to cancel the stop (inhibition) command instruction directed to the device 101. More specifically, the device-untargeted-for-management control unit 507 deletes information about the device 101 set in the stop information table (FIG. 8G) and the stop schedule information table (FIG. 8H). Moreover, the device-untargeted-for-management control unit 507 records a value "4" indicative of communication stop (inhibition) cancellation in the State Flag column for the device 101 in the stop candidate list table (FIG. 8E). After step S1111, the device-untargeted-for-management control unit 507 advances the processing to step S1112.

In step S1112, the device-untargeted-for-management control unit 507 transmits, to the device 101, a reply "0" indicative of the absence of a command in response to the communication stop command having been deleted in step S1111. Upon receiving the reply indicative of the absence of a command from the management apparatus 102, the device 101 ends the command inquiry, and then prepares for a command inquiry to be performed next time. After step S1112, the device-untargeted-for-management control unit 507 ends the processing in the present flowchart.

As illustrated in FIGS. 10 and 11 above, the device-untargeted-for-management control unit 507 is able to control execution of processing for inhibiting a communication performed from a device extracted as a communication stop target by the periodic processing control unit 506.

While a stop (inhibition) control method for a communication volume using communication stop and the cancellation of communication stop (inhibition) have been described above, a condition for the cancellation is not limited to a communication occurring at the time of placement. For example, a communication performed when the user uses and operates a notification function related to the management of the device 101, such as a button used to request a service call or a connectivity test button used to test a communication situation, can be set as a condition for the cancellation. In other words, the communication serving as a condition for the cancellation includes, for example, a communication performed in response to the user's operation related to the placement of the device 101 and a communication performed in response to the user's operation related to the management of the device 101. Moreover, each communication is not limited to a communication performed one time, and, in consideration of, for example, an erroneous operation of the user using the device 101, such a condition that the cancellation of communication stop (inhibition) be performed in a case where the above-mentioned communication corresponding to the cancellation has been performed two or more times can be provided. In other words, such a condition that, in a case where a specific communication such as that described above has been received a plurality of times, the cancellation is performed can be provided.

Figure 12:
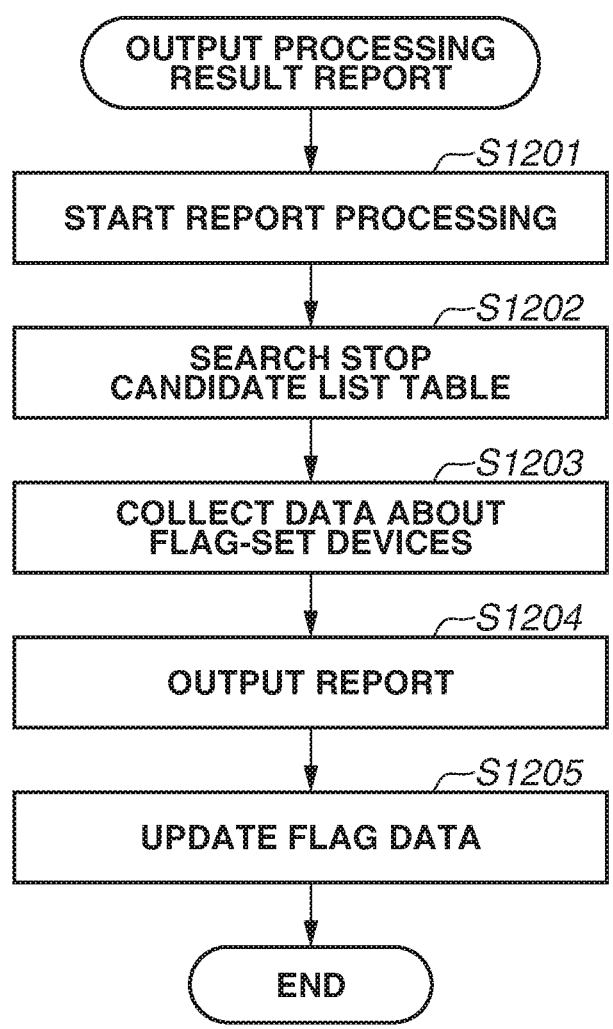
FIG. 12 is a flowchart illustrating an example of report output processing for a communication stop processing result.

FIG. 12 is a flowchart illustrating an example of processing for reporting a result of communication stop processing. Processing in the flowchart of FIG. 12 is directed to facilitating understanding a result of processing (FIGS. 9 to 11) performed on a device 101 that is not registered with the management apparatus 102. Furthermore, this result is stored in the State Flag column of the stop candidate list table (FIG. 8E), and is thus used to output a report. Moreover, processing in the flowchart of FIG. 12 is performed by the device-untargeted-for-management control unit 507 of the management apparatus 102. In other words, processing in the flowchart of FIG. 12 is implemented by the CPU 301 of the management apparatus 102 executing a program stored in, for example, the ROM 303 or the storage device 304.

In step S1201, the device-untargeted-for-management control unit 507 starts report processing. In step S1202, the device-untargeted-for-management control unit 507 searches the stop candidate list table (FIG. 8E), and, in step S1203, collects devices the value of the State Flag column of which in the stop candidate list table (FIG. 8E) is set to "1" or more. Furthermore, a device for which no value is set in the State Flag column is in a condition of being a communication stop candidate, and is, therefore, excluded from output targets for the report.

Then, in step S1204, the device-untargeted-for-management control unit 507 generates a report (outputs a report) as a data file indicating the states of target devices 101 collected in step S1203. This report contains a result of stop (inhibition) processing corresponding to the state flag extracted from the stop candidate list table (FIG. 8E) and the registration date and time, thus enabling understanding a result of processing performed on a communication stop target device.

Then, in step S1205, the device-untargeted-for-management control unit 507 updates the value of the State Flag column of the stop candidate list table (FIG. 8E) corresponding to a device with respect to which a report has been output in step S1204 with a value "0" indicating that a report has previously been output, and then ends the processing in the present flowchart.

Furthermore, processing for outputting a processing result report illustrated in the present flowchart can be periodically performed or can be performed only when there is data to be updated or according to a manual instruction.

As described above, according to the present exemplary embodiment, while the degree of freedom of the order of the operation for placement of the device 101 and the registration thereof with the management apparatus 102 is kept, in a case where monitoring is not started as the device is not registered with the management apparatus 102 while continuing a communication for a predetermined time, an unnecessary communication from the device 101 can be stopped (inhibited). Furthermore, even in a case where the above-mentioned condition for communication stop (inhibition) is satisfied, execution of stop (inhibition) is canceled upon receiving a communication (operation) related to placement, so that a communication from a device 101 that is likely to be managed can be continued. Moreover, in consideration of a case where the device 101 was removed from the placement destination, a device from which a communication has ceased to continue can be excluded from stop (inhibition) targets. Additionally, a device with respect to which an instruction for communication stop (inhibition) has not been able to be executed for a predetermined period or more can also be excluded from targets for communication stop (inhibition).

Accordingly, an unnecessary communication performed from a device and deemed to be untargeted for management can be reduced, and, in consideration of a communication situation or the presence or absence of a specific communication from a device, control of communication volume reduction can be canceled, so that an operation for appropriate device management can be performed.

While, in the above-described first exemplary embodiment, a configuration has been described in which an instruction for communication stop is issued to a device 101 which is unregistered for a predetermined period and from which a communication is continuing, a configuration in which an instruction other than that for stop is issued to the device 101 can be employed as long as the communication volume can be reduced. In a second exemplary embodiment, a configuration is described in which an instruction for reducing the communication volume is issued to a device 101 which is unregistered for a predetermined period and from which a communication is continuing.

In the first exemplary embodiment, in step S1005 illustrated in FIG. 10, a command for communication stop is set or a schedule equivalent to stop is set according to the setting value in the stop information table (FIG. 8G). However, in the second exemplary embodiment, in step S1005 illustrated in FIG. 10, an instruction for reducing the communication volume other than that for stop is set, so that the reduction of the communication volume can be implemented. An instruction for communication volume reduction set in step S1005 illustrated in FIG. 10 is transmitted to the device 101 in step S1107 illustrated in FIG. 11. As a result, when a flag corresponding to the content of the instruction is set in step S1109 or S1110 illustrated in FIG. 11, it is possible to check on which device the communication volume reduction processing has been performed based on a report output by the processing illustrated in FIG. 12.

A method for setting an instruction in step S1005 illustrated in FIG. 10 at the management apparatus 102 and a method for issuing an instruction for communication volume reduction other than that for stop are described.

FIGS. 13A and 13B illustrate tables that are used in the second exemplary embodiment. In the second exemplary embodiment, FIGS. 13A and 13B are used instead of FIG. 8H. In other words, the tables illustrated in FIGS. 8A to 8G and FIGS. 13A and 13B are tables prepared in a database of the management apparatus 102. Data stored in the storage device 304 corresponds to the data stored in the database.

A communication inhibition setting table illustrated in FIG. 13A is a table representing definitions of inhibition setting items of communication stop control performed on a device 101 serving as a stop target illustrated in FIG. 9 and subsequent figures, and includes an Inhibition Setting column and a Communication Stop or Restraining Method column. In the Inhibition Setting column of the communication inhibition setting table (FIG. 13A), a value "0" defines a command for stopping all of the communications from the device 101 described in the first exemplary embodiment. Moreover, a value "1" defines transmitting a schedule equivalent to stop described in the first exemplary embodiment.

Since, as mentioned above, an aspect of the embodiments is directed to reducing a volume of communication from a device, in the case of the second exemplary embodiment, the following methods for reducing the communication volume using other than stop are also defined.

In the Inhibition Setting column, a value "2" defines a method for reducing the communication volume by increasing an interval between communications. A schedule information table (FIG. 13B) indicates an example of the inhibition setting "2", in which a billing counter, which has a large communication volume, is set valid and has a notification interval of 180 days (4,320 hours) and a command inquiry, which has a small communication volume, is set valid and has a notification interval of 10 days (240 hours). The reason why such a setting is provided is to avoid a situation in which, since there are many cases where incomplete operations may require a long time until registration is completed, if all of the communications are stopped after a predetermined period, a service engineer would be dispatched at the time of resumption. Since, in a case where a communication is continuing, the management apparatus 102 is able to transmit a command for communication resumption in response to an inquiry from the device 101, the above setting is effective for the case of intending to resume a communication from the device 101 in the situation that, for example, the registration with the management apparatus 102 was not in time.

Furthermore, in the Inhibition Setting column, a value "3" defines a method of stopping only a specific communication (for example, a notification about the billing counter) and keeping the other communications (for example, a command inquiry communication) set to conventional notification intervals. In this way, the inhibition setting "3" is the setting for reducing the communication volume by stopping a specific communication which has a large communication volume (in the above example, a notification about the billing counter) while keeping a state of allowing a prompt command instruction.

Furthermore, in the Inhibition Setting column, a value "4" indicates a filtering operation command, which is a command for causing the device 101 to perform control to restrain a communication in a case where a given condition is satisfied. The device 101 is to have a function of, according to a condition previously registered therewith and used to restrain a communication, for example, in a case where twenty or more communications occur a day, not transmitting the twenty-first and later communications until the elapse of a predetermined period. Moreover, filtering can be performed in such a way that, during one week from the occurrence of the preceding communication, any communication is not allowed to be performed to the management apparatus 102. Additionally, in the condition for inhibition, a communication which has a larger communication volume as compared with the other communications depending on the types of communications for notification or the specifications of the device 101 can be set as an inhibition target. Furthermore, a notification indicating that the device 101 is estimated to be in a state in which, while the communication volume is small, the frequency of occurrence of communications is high can be set as a target for the filtering condition. Moreover, a method in which the management apparatus 102 transmits, to the device 101, the filtering method as a reply to a communication performed at the time of placement can also be employed. Additionally, the inhibition settings "0" to "4" are not limiting, and other inhibition settings can also be defined and used.

As described above, in the second exemplary embodiment, patterns for reducing the communication volume, such as inhibition settings (in the example illustrated in FIG. 13A, "0" to "4"), are provided, so that inhibition control of communications can be performed according to the actual operation situation.

Furthermore, this inhibition method can be configured in such a manner that various settings can be separately performed with respect to respective ranges, such as a unit of product, a unit of placement destination client, a unit of management company, and a unit of area. Such a configuration of the inhibition method enables performing finely-tuned operations. For example, the management apparatus 102 has various inhibition methods previously set for a unit of product, a unit of placement destination client, a unit of area, and a destination, and is configured to perform communication inhibition control individually based on the settings.

As described above, the waste of a communication source by an unregistered device caused by the fact that the placement and registration of the device are able to be performed in no particular order can be prevented and, at the same time, the dispatch of a service engineer can be reduced by keeping a necessary communication, so that an issue occurring in a conventional device monitoring system can be resolved. Accordingly, even in a system in which the placement and registration of a device are able to be performed in no particular order, appropriate operations for device management can be performed.

Furthermore, the above-mentioned configurations of various pieces of data and contents thereof are not limiting, but can be changed to various configurations and contents according to the usage or purpose.

While some exemplary embodiments have been described above, the disclosure can be embodied as, for example, a system, an apparatus, a method, a program, and a storage medium. More specifically, the disclosure can be applied to a system composed of a plurality of devices, or can be applied to an apparatus composed of a single device.

Furthermore, a configuration obtained by combining all or some of the above-described exemplary embodiments is also included in the disclosure.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-009608 filed Jan. 21, 2016, which is hereby incorporated by reference herein in its entirety.

What is claimed is:

1. A monitoring system comprising one or more devices and a management apparatus executing a registration process of device information which includes identification information of a device to be targeted for monitoring and is used for managing the device, wherein the management apparatus includes at least one memory storing second instructions and at least one processor executing the second instructions causing the management apparatus to:
provide a registration screen for the registration process, wherein, in addition to the device information, address information used for a device management is input via the registration screen;
execute the registration process according to inputs via the registration screen, and wherein each of the devices includes at least one memory storing first instructions and at least one processor executing the first instructions causing the device to:
in response to a user operation performed when the device itself is placed in a client environment, perform a communication, which includes identification information of the device, for initiating monitoring by the management apparatus, from the device to the management apparatus, wherein periodic communication with the management apparatus, at least including an inquiry, is continued even in a case of a failure in the communication for initiating monitoring, and wherein the second instructions further causes the management apparatus to:
manage a communication history of one or more communications that were performed from each device to the management apparatus;
in a case where a history which indicates that one or more communications were performed by one or more devices about which device information is not registered based on the registration process is managed as the communication history, extract a device which satisfies a predetermined condition from among the one or more devices; and
perform, as processing for inhibiting one or more communications that are performed from the extracted device, an instruction to the extracted device, wherein the instruction is distributed to the extracted device as reply to the inquiry performed from the extracted device.

2. The monitoring system according to claim 1, wherein the device which satisfies the predetermined condition is a device which is continuing a communication with the management apparatus for a predetermined period or more.

3. The monitoring system according to claim 1, wherein the second instructions further cause the management apparatus to:
manage, using a table, information about targets for execution of the processing for inhibiting the one or more communications, and
delete, when receiving a specific communication from a device serving as a target for execution of the processing for inhibiting the one or more communications, information of the device from the table.

4. The monitoring system according to claim 3, wherein the specific communication includes a communication performed in response to a user operation associated with placement of a device or a communication performed in response to a user operation associated with management of a device.

5. The monitoring system according to claim 1, wherein the second instructions further cause the management apparatus to:
store a result of execution of the processing for inhibiting the one or more communications; and
generate a report indicating the stored result of execution of the processing for inhibiting the one or more communications.

6. A method for a monitoring system that includes one or more devices and a management apparatus executing a registration process of device information which includes identification information of a device to be targeted for monitoring and is used for managing the device, the method comprising:
providing a registration screen for the registration process, wherein, in addition to the device information, address information used for a device management is input via the registration screen;
executing the registration process according to inputs via the registration screen; and
via each of the devices, in response to a user operation performed when the device itself is placed in a client environment, performing a communication, which includes identification information of the device, for initiating monitoring by the management apparatus, from the device to the management apparatus,
wherein periodic communication with the management apparatus, at least including an inquiry, is continued even in a case of a failure in the communication for initiating monitoring;
via the management apparatus, managing a communication history of one or more communications that were performed from each device to the management apparatus;
via the management apparatus, in a case where a history which indicates that one or more communications were performed by one or more devices about which device information is not registered based on the registration process is managed as the communication history, extracting a device which satisfies a predetermined condition from among the one or more devices; and
via the management apparatus, performing, as processing for inhibiting one or more communications that are performed from the extracted device, an instruction to the extracted device,
wherein the instruction is distributed to the extracted device as reply to the inquiry performed to the extracted device,
wherein the instruction is distributed to the extracted device as reply to the inquiry performed from the extracted device.

7. The method according to claim 6, wherein the device which satisfies the predetermined condition is a device which is continuing a communication with the management apparatus for a predetermined period or more.

8. The method according to claim 6, further comprising:
via the management apparatus,
managing, using a table, information about targets for execution of the processing for inhibiting the one or more communications, and
deleting, when receiving a specific communication from a device serving as a target for execution of the processing for inhibiting the one or more communications, information of the device from the table.

9. The method according to claim 8, wherein the specific communication includes a communication performed in response to a user operation associated with placement of a device or a communication performed in response to a user operation associated with management of a device.

10. The method according to claim 6, further comprising:
via the management apparatus, storing a result of execution of the processing for inhibiting the one or more communications; and
via the management apparatus, generating a report indicating the stored result of execution of the processing for inhibiting the one or more communications.

11. The monitoring system according to claim 1, wherein the second instructions further cause the management apparatus to:
manage, using a table, information about targets for execution of the processing for inhibiting the one or more communications, and
delete, from the table, information of a device to which the processing for inhibiting the one or more communications is not completed.

12. The method according to claim 6, further comprising:
via the management apparatus,
managing, using a table, information about targets for execution of the processing for inhibiting the one or more communications, and
deleting, from the table, information of a device to which the processing for inhibiting the one or more communications is not completed.

13. The monitoring system according to claim 1, wherein, in the performed instruction, a relatively longer interval is set for a first communication type, in which a larger amount of data is communicated in one communication, than for a second communication type, in which a smaller amount of data is communicated in one communication.

14. The method according to claim 6, wherein, the performing the communication includes setting a relatively longer interval for a first communication type, in which a larger amount of data is communicated in one communication, than for a second communication type, in which a smaller amount of data is communicated in one communication.

* * * * *